US012743825B2

(12) United States Patent
Dhanuka et al.

(10) Patent No.: US 12,743,825 B2
(45) Date of Patent: Sep. 22, 2026

(54) STRUCTURE-AWARE INTERTWINING OF DIGITAL OBJECTS

(71) Applicant: Adobe Inc., San Jose, CA (US)

(72) Inventors: Praveen Kumar Dhanuka, Howrah (IN); Siddhartha Chaudhuri, Bangalore (IN); Nathan Carr, San Jose, CA (US); Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 56 days.

(21) Appl. No.: 18/434,310

(22) Filed: Feb. 6, 2024

(65) Prior Publication Data

US 2025/0252626 A1 Aug. 7, 2025

(51) Int. Cl.
*G06T 11/26* (2026.01)
*G06T 11/60* (2026.01)

(52) U.S. Cl.
CPC .............. *G06T 11/26* (2026.01); *G06T 11/60* (2013.01)

(58) Field of Classification Search
CPC ......... G06T 11/206; G06T 11/60; G06T 11/20
See application file for complete search history.

(56) References Cited

U.S. PATENT DOCUMENTS 9,959,647 B1 * 5/2018 Brost .................. G06V 10/426
11,132,821 B1 * 9/2021 Gupta ................. G06F 3/04845
11,282,277 B1 * 3/2022 Phogat .................. G06T 15/503
2021/0142479 A1 * 5/2021 Phogat ...................... G06T 7/11
2023/0398805 A1 * 12/2023 Franken ................ B42D 25/20
2024/0070944 A1 2/2024 Kumar et al.
2024/0212242 A1 6/2024 Kumar et al.
2024/0257408 A1 8/2024 Kumar et al.
2024/0265719 A1 * 8/2024 Ding .................. G06V 30/1914
2025/0029259 A1 1/2025 Dhanuka et al.

FOREIGN PATENT DOCUMENTS

AU 2023282216 A1 2/2025

OTHER PUBLICATIONS

J. Lopez-Moreno, et al., "Depicting Stylized Materials with Vector Shade Trees", ACM Transactions on Graphics, vol. 32, No. 4, Article 118, Jul. 2013, pp. 118:1-118:10 (Year: 2013).*
J. Lopez-Moreno (Year: 2013).*

(Continued)

*Primary Examiner* — Jin Cheng Wang
(74) *Attorney, Agent, or Firm* — Keller Preece PLLC

(57) ABSTRACT

The present disclosure relates to systems, non-transitory computer-readable media, and methods for generating intertwined digital designs according to the visual order of structural graph nodes. In particular, in one or more embodiments, the disclosed systems generate, by at least one processor, a structural graph of a digital design that represents overlapping surfaces of objects in the digital design as nodes and object paths between the overlapping surfaces as edges. Further, the disclosed systems assign, by the at least one processor, a visual order to the nodes based on a configuration of the structural graph. Moreover, the disclosed systems generate, by the at least one processor, an intertwined digital design by ordering the overlapping surfaces of the objects in accordance with the assigned visual order of the nodes.

20 Claims, 16 Drawing Sheets

1100

Generate An Intertwined Digital Design By Ordering The Overlapping Surfaces Of The Objects In Accordance With The Assigned Visual Order Of The Nodes 1102

Generate Outlines Of Objects Within A Digital Design To Determine Boundaries Of The Objects 1104

Generate, Based On The Boundaries Of The Objects, A Structural Graph Of The Digital Design That Represents Overlapping Surfaces Of The Objects In The Digital Design As Nodes And Object Paths Between The Overlapping Surfaces As Edges 1106

Assign A Visual Order To The Nodes Of The Structural Graph Utilizing A Heuristic That Causes Adjacent Overlapping Areas To Have Different Objects On Top And Seeks To Achieve Intertwining Symmetry 1108

(56) References Cited

OTHER PUBLICATIONS

Donald Crowe. "Symmetries of culture", Department of Mathematics, University of Wisconsin-Madison, University of Washington Press, pp. 20,1988.
Georgios Rokos, Gerard Gorman, and Paul H J Kelly. "A fast and scalable graph coloring algorithm for multi-core and many-core architectures", arXiv:1505.04086v2, pp. 12, May 18, 2015.
James McCann and Nancy Pollard. "Local layering", ACM Transactions on Graphics, 28(3), Aug. 2009.
Paul Asente, Mike Schuster, and Teri Pettit. "Dynamic planar map illustration". In ACM SIGGRAPH 2007 Papers, SIGGRAPH '07, pp. 10, New York, NY, USA, Association for Computing Machinery, Jul. 2007.
Rudolf Arnheim. "Art and visual perception: A psychology of the creative eye", Berkley: University of California Press, 1974.
Combined Search and Examination Report as received in United Kingdom application No. GB218889.7 dated Apr. 16, 2026.
Search Report as received in United Kingdom Application No. 2407769.5 dated Oct. 22, 2024.

* cited by examiner

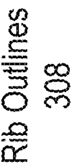
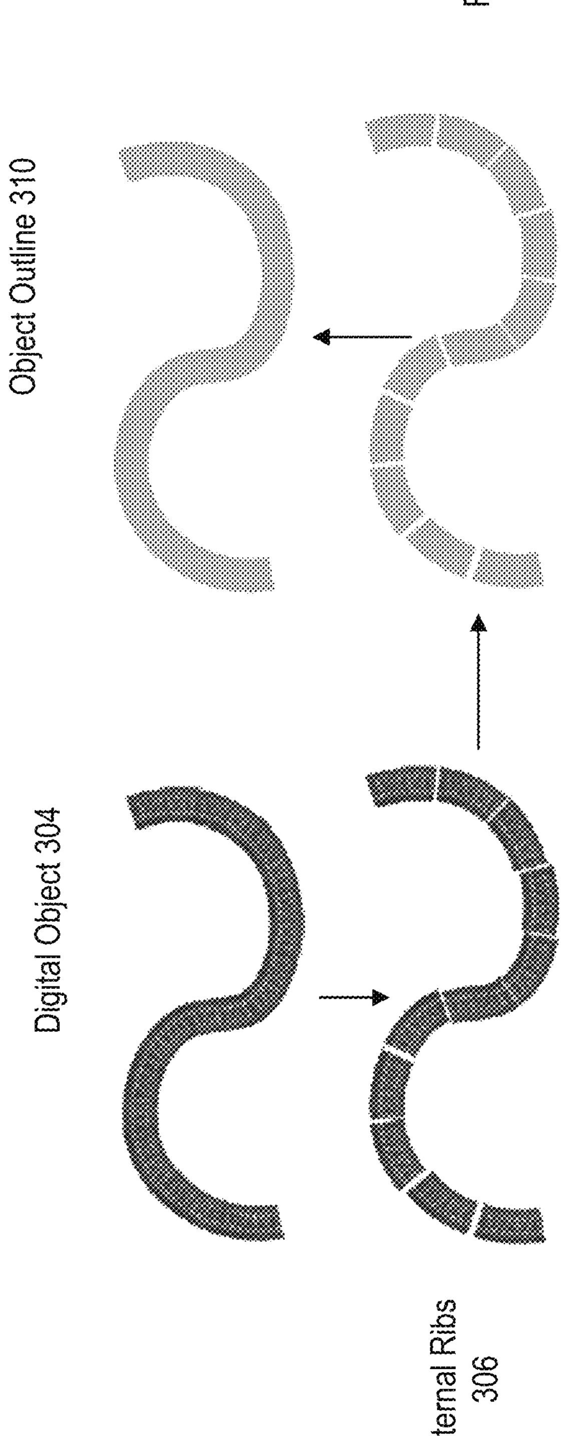
*Fig. 3B*

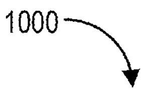

Generating An Intertwined Digital Design By Ordering The Overlapping Surfaces Of The Objects In Accordance With The Assigned Visual Order Of The Nodes 1002

Generating A Structural Graph Of A Digital Design That Represents Overlapping Surfaces Of Objects In The Digital Design As Nodes And Object Paths Between The Overlapping Surfaces As Edges 1004

Assigning A Visual Order To The Nodes Based On A Configuration Of The Structural Graph 1006

*Fig. 10*

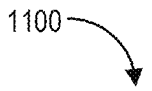

Generate An Intertwined Digital Design By Ordering The Overlapping Surfaces Of The Objects In Accordance With The Assigned Visual Order Of The Nodes 1102

Generate Outlines Of Objects Within A Digital Design To Determine Boundaries Of The Objects 1104

Generate, Based On The Boundaries Of The Objects, A Structural Graph Of The Digital Design That Represents Overlapping Surfaces Of The Objects In The Digital Design As Nodes And Object Paths Between The Overlapping Surfaces As Edges 1106

Assign A Visual Order To The Nodes Of The Structural Graph Utilizing A Heuristic That Causes Adjacent Overlapping Areas To Have Different Objects On Top And Seeks To Achieve Intertwining Symmetry 1108

*Fig. 11*

STRUCTURE-AWARE INTERTWINING OF DIGITAL OBJECTS

BACKGROUND

Recent years have seen significant improvements in hardware and software platforms for creating and modifying digital designs. For example, many platforms offer software applications that edit objects within a digital design. To illustrate, some image processing applications enable localized reordering of portions of vector objects to create an appearance of depth between the portions of the vector objects. For example, in some cases, some image processing applications reorder portions of vector objects such that some portions of a first vector object appear above a second vector object, while other portions of the first vector object appear below the second vector object. In order to generate such an "intertwined" appearance between the first and second vector objects using conventional systems, a user edits the vector objects by at least manually adding and/or removing portions of the first and second vector objects to create the appearance of depth. This process is tedious and prone to user error. Further, such manual modification of vector objects often results in destruction of original geometries of the first and second vector objects. Thus, applying these effects to create even minimally complex designs is often time and resource intensive and prone to errors.

SUMMARY

Embodiments of the present disclosure provide benefits and/or solve one or more of the foregoing or other problems in the art with systems, non-transitory computer-readable media, and methods for intertwining digital objects utilizing a structural connectivity analysis of the object components. In particular, the disclosed systems automatically and intelligently intertwine vector objects in a digital design based on a structural analysis of the objects. For example, in one or more embodiments, the disclosed systems generate a structural graph of a digital design representing overlapping surfaces of objects in the digital design as nodes. Further, in some implementations, the disclosed systems assign a visual order to the nodes specifying which of the overlapping objects will be visible at that location in an intertwined digital design. Moreover, in one or more embodiments, the disclosed systems generate the intertwined digital design by ordering the overlapping surfaces of the objects according to the assigned visual order of the nodes resulting in the intertwining of the objects.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A and 3B illustrate diagrams of generating object outlines of digital objects in a digital design in accordance with one or more embodiments.

FIG. 10 illustrates an example series of acts for generating an intertwined digital design based on a structural graph in accordance with one or more embodiments.

FIG. 11 illustrates an example series of acts for generating an intertwined digital design in accordance with one or more embodiments.

DETAILED DESCRIPTION

Figure 1:
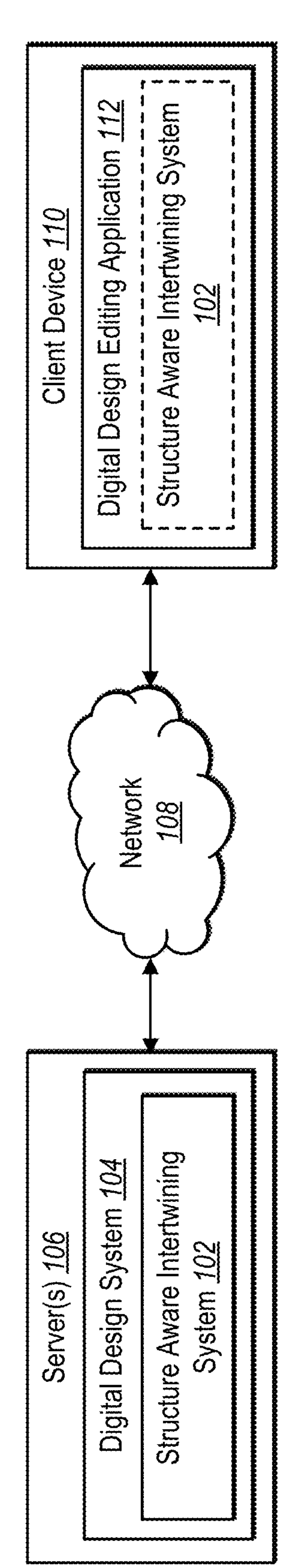
FIG. 1 illustrates an example system environment in which a structure aware intertwining system operates in accordance with one or more embodiments.

This disclosure describes one or more embodiments of a structure aware intertwining system that intertwines digital design objects based on a structural graph of the objects' connectivity. In particular, the structure aware intertwining system generates a structural graph of a digital design that represents overlapping surfaces of objects in the digital design as nodes. Further, in some implementations, the structure aware intertwining system assigns a visual order to the nodes, thereby specifying which of the overlapping objects will be visible at that location in the intertwined digital design. Moreover, in one or more embodiments, the structure aware intertwining system generates the intertwined digital design by ordering the overlapping surfaces of the objects according to the assigned visual order of the nodes resulting in the intertwining of the objects.

As mentioned above, in some embodiments, the structure aware intertwining system generates a structural graph of a digital design that represents overlapping surfaces of objects in the digital design as nodes. To generate the structural graph, in some implementations, the structure aware intertwining system generates a planar graph representing planar faces of digital objects as a vertex and connections between vertices as edges. Further, in one or more embodiments, the structure aware intertwining system identifies vertices where more than one object intersect. Moreover, in one or more implementations, the structure aware intertwining system contracts adjacent vertices (e.g., vertices sharing an edge) where more than one object intersect into a single vertex. Furthermore, in some embodiments, the structure aware intertwining system removes vertices that do not represent a location where more than one object intersect to generate the structural graph. Accordingly, in these or other embodiments, the structural graph represents the vertices representing overlapping surfaces of objects (i.e., nodes) and the edges connecting the nodes.

As noted above, in some implementations, the structure aware intertwining system assigns a visual order to the nodes, thereby specifying which of the overlapping objects will be visible at that location in the intertwined digital design. In one or more embodiments, in assigning the visual order to the nodes, the structure aware intertwining system uses a heuristic that causes adjacent nodes representing the overlapping areas of the objects to have different objects on top and seeks to achieve intertwining symmetry. In one or more implementations, the structure aware intertwining system utilizes any of a variety of algorithms to achieve the intertwining of adjacent nodes. For example, in some embodiments, the structure aware intertwining system uses a greedy algorithm to assign the visual order to each node.

As mentioned, in one or more embodiments, the structure aware intertwining system generates the intertwined digital design by ordering the overlapping surfaces of the objects according to the assigned visual order of the nodes. Thus, the structure aware intertwining system generates an intertwined digital design where the objects are intertwined due to the varying visual order of adjacent overlapping surfaces of the objects. Furthermore, in one or more implementations, the structure aware intertwining system generates multiple intertwine options by assigning the visual order to the nodes in different ways. Indeed, in these or other embodiments, the structure aware intertwining system displays the multiple intertwine options for comparison and selection by a user.

As noted, in some embodiments, the structure aware intertwining system receives user input specifying or modifying a visual order of the objects at a node. In response, the structure aware intertwining system reorders the assigned visual order of the remaining nodes accordingly. For example, the structure aware intertwining system receives user input specifying a visual order of the objects at one or more specific areas of overlapping objects in the digital design. Further, in these or other embodiments, the structure aware intertwining system uses a heuristic that causes adjacent nodes representing the overlapping areas of the objects to have different objects on top to reorder the remaining overlapping surfaces of the objects accordingly. Thus, in these or other embodiments, the structure aware intertwining system generates an assisted intertwined digital design using the received user input.

Furthermore, in various embodiments the structure aware intertwining system intertwines all overlap locations, a percentage of the overlap locations, or skips over locations that fail to meet a threshold distance from a previously intertwined location. For example, in some implementations, the structure aware intertwining system intertwines every location where the objects overlap. In other embodiments, the structure aware intertwining system generates only a specified percentage of the overlap locations resulting in intertwining of objects that gives a different appearance (e.g., a more random intertwining). Furthermore, in one or more embodiments, the structure aware intertwining system determines which nodes to assign a visual order based on the surface area of the digital design between nodes. For example, in these or other embodiments, the structure aware intertwining system utilizes a threshold area size to determine which nodes to assign a visual order.

Although conventional systems provide various tools for modifying objects in digital designs to achieve object intertwining effects, conventional systems have a number of disadvantages with respect to efficiency and flexibility of operation. For instance, conventional systems inefficiently modify digital design objects by requiring numerous user interactions to achieve design effects such as object intertwining. More specifically, conventional systems require user interactions at each location where objects overlap to order the layering of objects. Thus, to order objects conventional systems require use of various user interface tools, menus, and user interactions. The more complex the intertwining effect, the more resources are required to achieve the effect. Furthermore, when a user desires to view different object intertwine outcomes, conventional systems require large numbers of inputs to achieve intertwining for each unique possible outcome. This inefficiency is particularly problematic in cases of complex digital designs having many overlapping surfaces between objects.

Furthermore, conventional systems demonstrate operational inflexibility by requiring manual ordering of objects at each overlapping surface between objects to achieve an overall intertwining effect, in addition to their inefficiencies. For instance, when intertwining objects, conventional systems require input to manually order objects at each overlapping surface between objects. These manual operations quickly become burdensome with even minimally complex designs, such as those having several overlapping surfaces between two objects or overlapping surfaces between multiple objects. To achieve an intertwining effect in such cases, conventional systems require a high degree of skill and experience. With greater complexity, such as designs with many overlapping regions between objects, conventional systems typically cannot quickly or easily achieve an intertwining effect between objects. This inflexibility is even more pronounced when conventional systems generate multiple options for intertwining objects. Indeed, with greater numbers of objects and overlapping surfaces between objects, a larger number of possible intertwining outcomes between the objects exist. The inflexibility of conventional systems to generate a visualization of the multiple intertwine options is prohibitive.

As suggested by the foregoing, the structure aware intertwining system provides a variety of advantages relative to conventional systems. For example, by automatically intertwining objects the structure aware intertwining system improves efficiency relative to conventional systems. Specifically, in some embodiments, the structure aware intertwining system automatically intertwines objects by receiving a single interaction. Thus, the need for multiple inputs such as inputs at each overlapping surface between objects to designate the visual order at each overlapping surface is avoided by the structure aware intertwining system. Moreover, in some embodiments, the structure aware intertwining system provides multiple intertwine options with different visual ordering of the overlapping surfaces for visualization and selection with minimal interactions (e.g., a single interaction). Accordingly, even with complex designs, the structure aware intertwining system provides improved efficiency over conventional systems. Additionally, structure aware intertwining system provides improved graphical user interfaces for generating intertwined objects. In contrast to conventional systems that require users to access and use a number of different graphical user interface tools, menus, and interactions to manually intertwine objects, the structure aware intertwining system provides a graphical user interface and system that provides intertwined objects in response to minimal user interaction. More specifically, the structure aware intertwining system displays one or more intertwined objects in response to a single interaction within a graphical user interface (e.g., a single button click).

Moreover, by automatically intertwining objects with minimal interactions the structure aware intertwining system improves flexibility relative to conventional systems. Specifically, in one or more embodiments, the structure aware intertwining system quickly and easily intertwines (e.g., by a single interaction) even complex designs with many objects and many overlapping surfaces. Furthermore, in one or more implementations, the structure aware intertwining system provides multiple intertwining options for visualization and selection with minimal interactions even with complex designs. Thus, the structure aware intertwining system improves upon flexibility of operation compared to conventional systems. Moreover, in some embodiments, even after selection of an intertwining option between objects from among multiple options, the structure aware intertwining system allows for a user to modify the ordering of one or more specific overlap surfaces between objects and automatically adjusts the remaining overlapping surfaces in the design to maintain the intertwining effect. Thus, the structure aware intertwining system allows for flexible manual adjustments to the intertwining design with minimal interactions while maintaining the improved efficiency as described above.

Additional detail regarding the structure aware intertwining system will now be provided with reference to the figures. For example, FIG. 1 illustrates a schematic diagram of an exemplary system 100 in which a structure aware intertwining system 102 operates. As illustrated in FIG. 1, the system 100 includes a server(s) 106, a network 108, and a client device 110. Although the system 100 of FIG. 1 is depicted as having a particular number of components, the system 100 is capable of having any number of additional or alternative components (e.g., any number of servers, client devices, or other components in communication with the structure aware intertwining system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 12). Moreover, the server(s) 106 and the client device 110 include one or more of a variety of computing devices (including one or more computing devices as discussed in greater detail with relation to FIG. 12).

As mentioned above, the system 100 includes the server(s) 106. In one or more embodiments, the server(s) 106 generates, stores, receives, and/or transmits data including notifications, models, and digital designs. In one or more embodiments, the server(s) 106 comprises a data server. In some implementations, the server(s) 106 comprises a communication server or a web-hosting server. Further, the server(s) 106 includes a digital design system 104 which further includes the structure aware intertwining system 102.

In one or more embodiments, the client device 110 includes computing devices that access, edit, segment, modify, store, and/or provide, for display, digital content such as digital designs. For example, the client device 110 includes smartphones, tablets, desktop computers, laptop computers, head-mounted-display devices, or other electronic devices. The client device 110 includes one or more applications (e.g., a digital design editing application 112) that access, edit, segment, modify, store, and/or provide, for display, digital content such as digital designs. For example, in one or more embodiments, the digital design editing application 112 includes a software application installed on the client device 110. Additionally, or alternatively, the digital design editing application 112 includes a software application hosted on the server(s) 106 which are accessible by the client device 110 through another application, such as a web browser.

To provide an example implementation, in some embodiments, the structure aware intertwining system 102 on the server(s) 106 supports the structure aware intertwining system 102 on the client device 110. In other words, the client device 110 obtains (e.g., downloads) the structure aware intertwining system 102 from the server(s) 106. Once downloaded, the structure aware intertwining system 102 on the client device 110 generates intertwined digital designs by ordering the overlapping surfaces of objects in accordance with an assigned visual order.

In alternative implementations, the structure aware intertwining system 102 includes a web hosting application that allows the client device 110 to interact with content and services hosted on the server(s) 106. To illustrate, in one or more implementations, the client device 110 accesses a software application supported by the server(s) 106. In response, the structure aware intertwining system 102 on the server(s) 106 generates and provides an intertwined digital design. The server(s) 106 then provides the intertwined digital design to the client device 110 for display.

To illustrate, in some cases, the structure aware intertwining system 102 on the client device 110 generates outlines of objects within a digital design via a software application supported by the server(s) 106. The client device 110 transmits generated outlines to the server(s) 106. In response, the structure aware intertwining system 102 on the server(s) 106 further generates a structural graph of the digital design, assigns a visual order to the nodes of the structural graph, and generates an intertwined digital design by ordering the overlapping surfaces of the objects in accordance with the assigned visual order of the nodes.

While, although FIG. 1 illustrates the structure aware intertwining system 102 implemented with regard to the server(s) 106, different components of the structure aware intertwining system 102 are able to be implemented by a variety of devices within the system 100. For example, a different computing device (e.g., the client device 110) or a separate server from the server(s) 106 implement one or more (or all) components of the structure aware intertwining system 102. Indeed, as shown in FIG. 1, the client device 110 includes the structure aware intertwining system 102. Example components of the structure aware intertwining system 102 will be described below with regard to FIG. 9.

Figure 2:
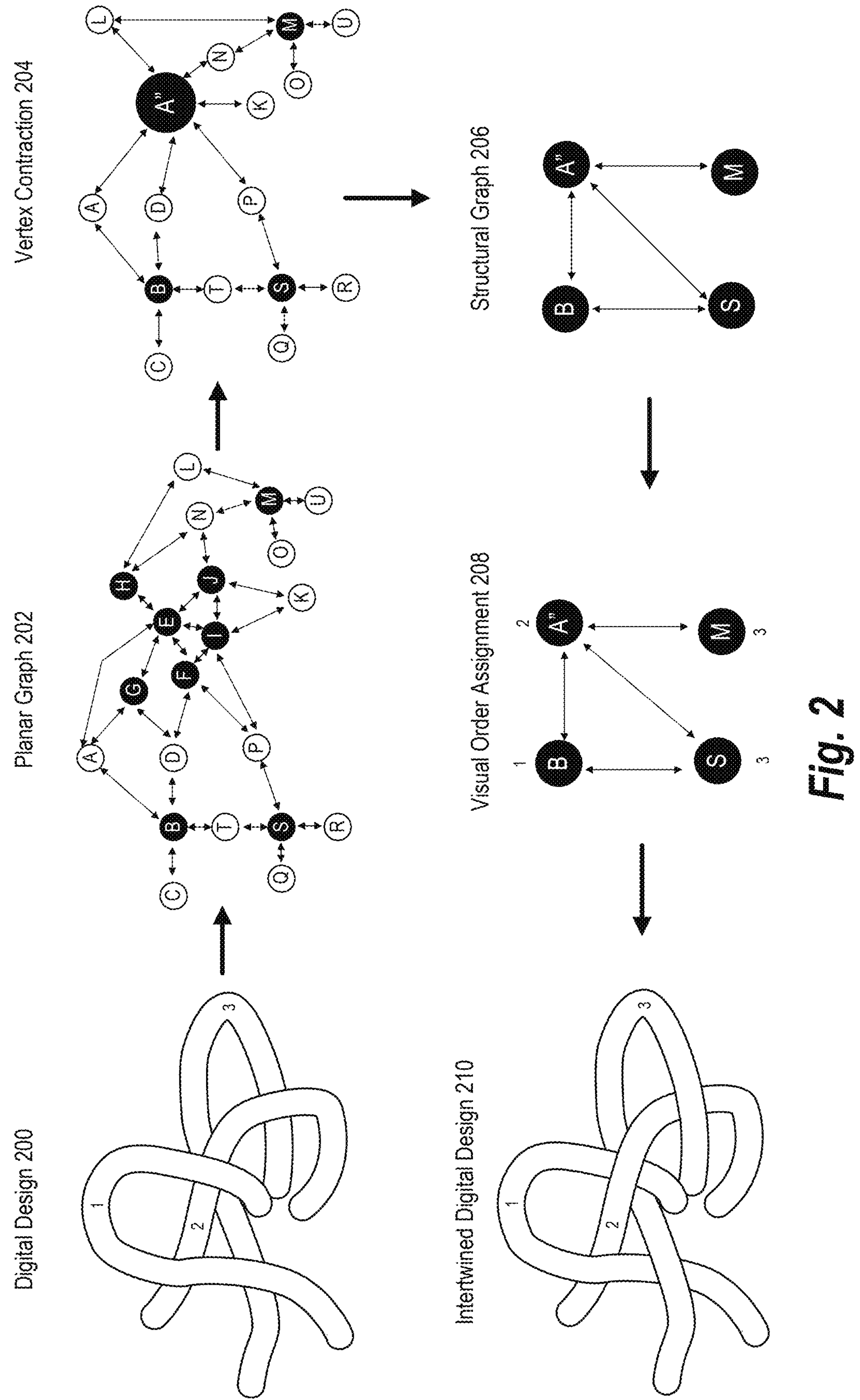
FIG. 2 illustrates a process flow of generating an intertwined digital design according to a visual order assignment in accordance with one or more embodiments.

As mentioned above, in some embodiments, the structure aware intertwining system 102 intertwines digital design objects by generating a structural graph of the objects' connectivity and an intertwined digital design according to an assigned visual order of object overlap locations. For example, FIG. 2 illustrates a process flow of generating an intertwined digital design according to a visual order assignment in accordance with one or more embodiments. Specifically, in some implementations, the structure aware intertwining system 102 generates a planar graph 202 of a digital design 200 having multiple overlapping objects (i.e., objects 1, 2, and 3). Moreover, in one or more embodiments, the structure aware intertwining system 102 generates, from the planar graph 202, a structural graph 206 of the digital design with only the vertices (i.e., nodes) that represent overlapping surfaces of the objects in the digital design 200 and the edges connecting these nodes. Furthermore, in one or more implementations, the structure aware intertwining system 102 generates the intertwined digital design (e.g., the intertwined digital design 210) by ordering the overlapping surfaces of the objects in accordance with the assigned visual order of the nodes.

As mentioned above, in some embodiments, the structure aware intertwining system 102 generates a planar graph 202 of the digital design 200. Indeed, the structure aware intertwining system 102 generates the planar graph 202 of the objects in the digital design 200 to include vertices corresponding to the surfaces of the objects and edges connecting the vertices. For example, as illustrated in FIG. 2, the planar graph 202 includes vertices A, B, C, etc. and edges connecting the vertices. Further, in some implementations, the structure aware intertwining system 102 generates an overlapping surface vertex group by determining which of the vertices correspond to overlapping surfaces of the objects in the digital design 200. For instance, the structure aware intertwining system 102 generates the overlapping surface vertex group including each of the shaded vertices (i.e., B, E, F, G, H, I, J, M, and S) of the planar graph 202.

As noted above, in one or more embodiments, the structure aware intertwining system 102 generates a structural graph 206 of the digital design. In these or other embodiments, the structure aware intertwining system 102 generates the structural graph 206 with only the vertices from the planar graph 202 that represent overlapping surfaces of the objects in the digital design 200 and the edges connecting these vertices. In one or more implementations, these vertices remaining in the structural graph are identified as nodes. For example, the structure aware intertwining system 102 generates the structural graph 206 including nodes A", B, M, and S. To do so, in one or more implementations, the structure aware intertwining system 102 performs a vertex contraction 204 and a vertex removal on the planar graph 202.

As just mentioned, in one or more implementations, the structure aware intertwining system 102 performs the vertex contraction 204 and the vertex removal on the planar graph 202. In these or other embodiments, the structure aware intertwining system 102 contracts adjacent vertices (e.g., vertices sharing an edge) of the overlapping surface vertex group into aggregate vertices. For example, the structure aware intertwining system 102 contracts vertices E, F, G, H, I, and J into a single aggregate vertex A". In this example, none of the remaining shaded vertices (i.e., vertices belonging to the overlapping surface vertex group) such as B, M, or S are adjacent to other vertices of the group and therefore the structure aware intertwining system 102 does not contract them. Additionally, in one or more embodiments, the structure aware intertwining system 102 removes the vertices that are not part of the overlapping surface vertex group (e.g., A, C, D, K, L, N, O, P, Q, R, T, U).

Furthermore, in one or more implementations, the structure aware intertwining system 102 generates the intertwined digital design (e.g., the intertwined digital design 210) by ordering the overlapping surfaces of the objects in accordance with the assigned visual order of the nodes. For example, in some embodiments, the structure aware intertwining system 102 performs a visual order assignment 208 wherein the structure aware intertwining system 102 assigns a visual order of the objects at each node of the structural graph 206. Further, in some embodiments, the structure aware intertwining system 102 uses a heuristic that causes adjacent overlapping areas to have different objects on top and seeks to achieve intertwining symmetry for the visual order assignment 208.

Thus, the structure aware intertwining system 102 generates the intertwined digital design 210 such that the overlapping regions of the objects are ordered according to the visual order assignment of each corresponding node in the structural graph 206. For example, the structure aware intertwining system 102 orders the objects of the intertwined digital design 210 such that object 3 is first (e.g., on top or in front) at the overlapping areas corresponding to nodes M and S according to the visual order assignment 208. Similarly, at the overlapping areas corresponding to nodes B and A, the structure aware intertwining system 102 orders the objects such that the object 1 and object 2 are first, respectively.

Figure 3A:
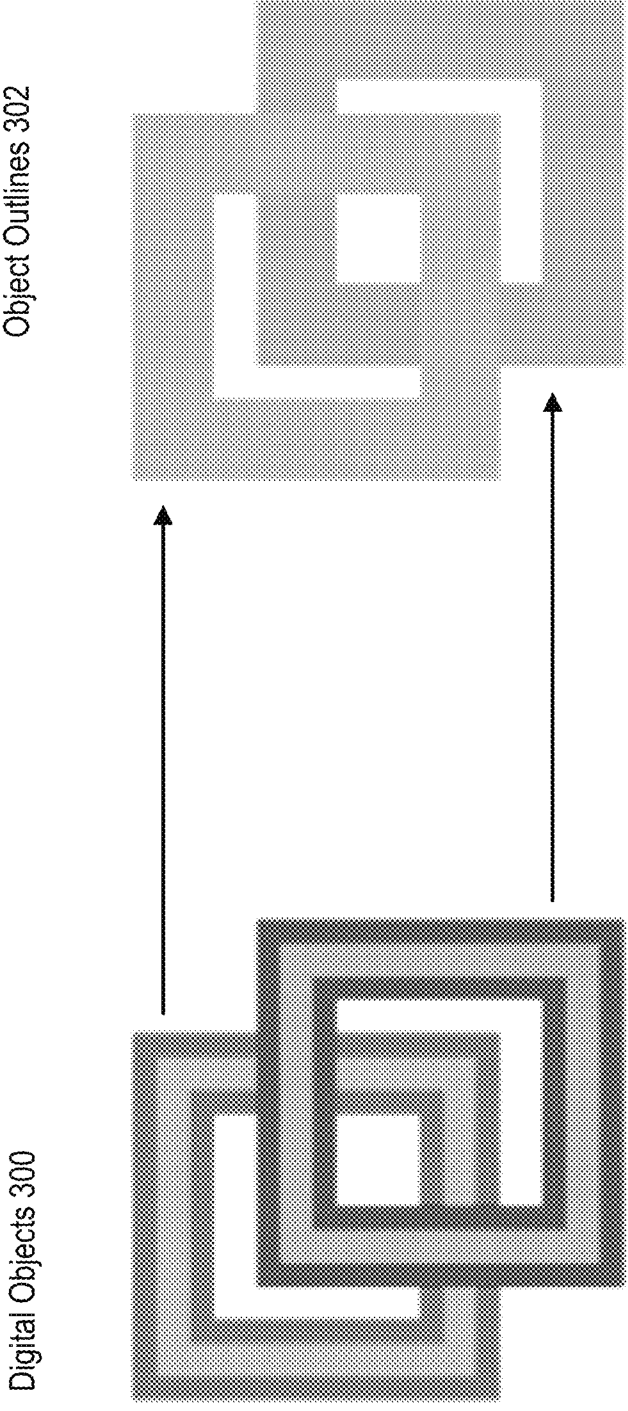

As mentioned above, in some embodiments, the structure aware intertwining system 102 generates a planar graph of the objects in a digital design (e.g., a digital design). In some implementations, as part of the planar graph generation, the structure aware intertwining system 102 generates outlines of objects within the digital design to determine boundaries of the objects. For example, FIGS. 3A and 3B illustrate diagrams of generating object outlines 302, 310 of digital objects 300, 304 in a digital design in accordance with one or more embodiments. Specifically, in some implementations, the structure aware intertwining system 102 generates outlines of objects to determine boundaries of the objects regardless of the tools used for creating the objects or the effects or styles of the objects.

In particular, FIG. 3A illustrates the structure aware intertwining system 102 generating object outlines 302 for relatively simple overlapping objects with various effects. Indeed, FIG. 3A illustrates a digital design with two digital objects 300, each having a filled and stroked path. In this and other embodiments, the structure aware intertwining system 102 generates the object outlines 302 to determine the boundaries for the two digital objects 300 regardless of the effects applied to the digital objects 300. Accordingly, in these or other embodiments, the structure aware intertwining system 102 generates the digital object outlines formed from the outermost boundaries of the objects.

FIG. 3B illustrates the structure aware intertwining system 102 generating an object outline for a digital object 304 created with a brush. For example, the structure aware intertwining system 102 generates the object outline 310 for the digital object 304 via various intermediate steps as shown. For example, in some implementations, the structure aware intertwining system 102 determines various internal ribs 306 of the digital object 304. In one or more embodiments, using this simplified series of structures (i.e., the internal ribs 306), the structure aware intertwining system 102 generates rib outlines 308. Further, in one or more implementations, the structure aware intertwining system 102 generates the unified object outline 310 from the rib outlines 308.

For instance, in one or more embodiments, the structure aware intertwining system 102 determines the objects including path objects and compound path objects defined by geometry but can include various effects such as stroke, fill, styles, brushes, patterns, images, and various other effects. In one example, to determine or obtain the object outlines, the structure aware intertwining system 102 converts the objects into graphic primitives, such as rasters and Bezier-bounded shapes with only fill effects applied. In other cases, for example where the structure aware intertwining system 102 cannot convert the objects into graphic primitives (e.g., rasters, meshes, raster brushes, etc.), the structure aware intertwining system 102 generates bounding boxes and/or other vector representations of the object outlines.

In some embodiments, once the structure aware intertwining system 102 converts an object into graphic primitives, the structure aware intertwining system 102 merges the graphic primitives into a single object to obtain the corresponding boundaries (e.g., the object outline for the particular object). For example, when the structure aware intertwining system 102 detects the regions where the objects can be intertwined, the outer boundaries of the objects are used and any internal details are not used (e.g., by merging the graphic primitives of the objects), thereby reducing the complexity of detecting the intersections between the objects (e.g., the regions).

In various embodiments such as described above with respect to FIG. 3B, where the structure aware intertwining system 102 adds a particular effect to an object to create non-vector objects (e.g., an image), the structure aware intertwining system 102 generates ribs (e.g., which are defined by vectors) for the non-vector object based on attributes of the effect (e.g., stroke width). In such embodiments, the ribs are non-overlapping and are combined to obtain the outline for the non-vector object. For example, the ribs are combined to obtain the outline of the entire path and/or object.

In some implementations, when combining components of objects (e.g., ribs, strokes, fills, and other geometries defined by the objects) the structure aware intertwining system 102 utilizes Boolean operations such as merge, union, combine, join, intersect, fragment, subtract, trim, offset, and/or other operations. For example, if an object includes a clipping mask, the structure aware intertwining system 102 merges the clipping mask is (e.g., using the merge operation) with the rest of the object so that the structure aware intertwining system 102 accurately obtains the outline for the object. In various embodiments, the structure aware intertwining system 102 utilizes a version of clipping that includes a technique used as part of digital design rendering to selectively enable and disable rendering operations with respect to the digital design. In one example, the structure aware intertwining system 102 uses clipping and/or clipping masks to define what is rendered within a particular region.

While FIGS. 3A and 3B illustrate various types of objects that the structure aware intertwining system 102 uses to generate object outlines and intertwined digital designs with intertwined objects, in some implementations, the structure aware intertwining system 102 uses any digital object. Indeed, an additional example of digital objects used by the structure aware intertwining system 102 are illustrated in FIG. 8.

Figure 4:
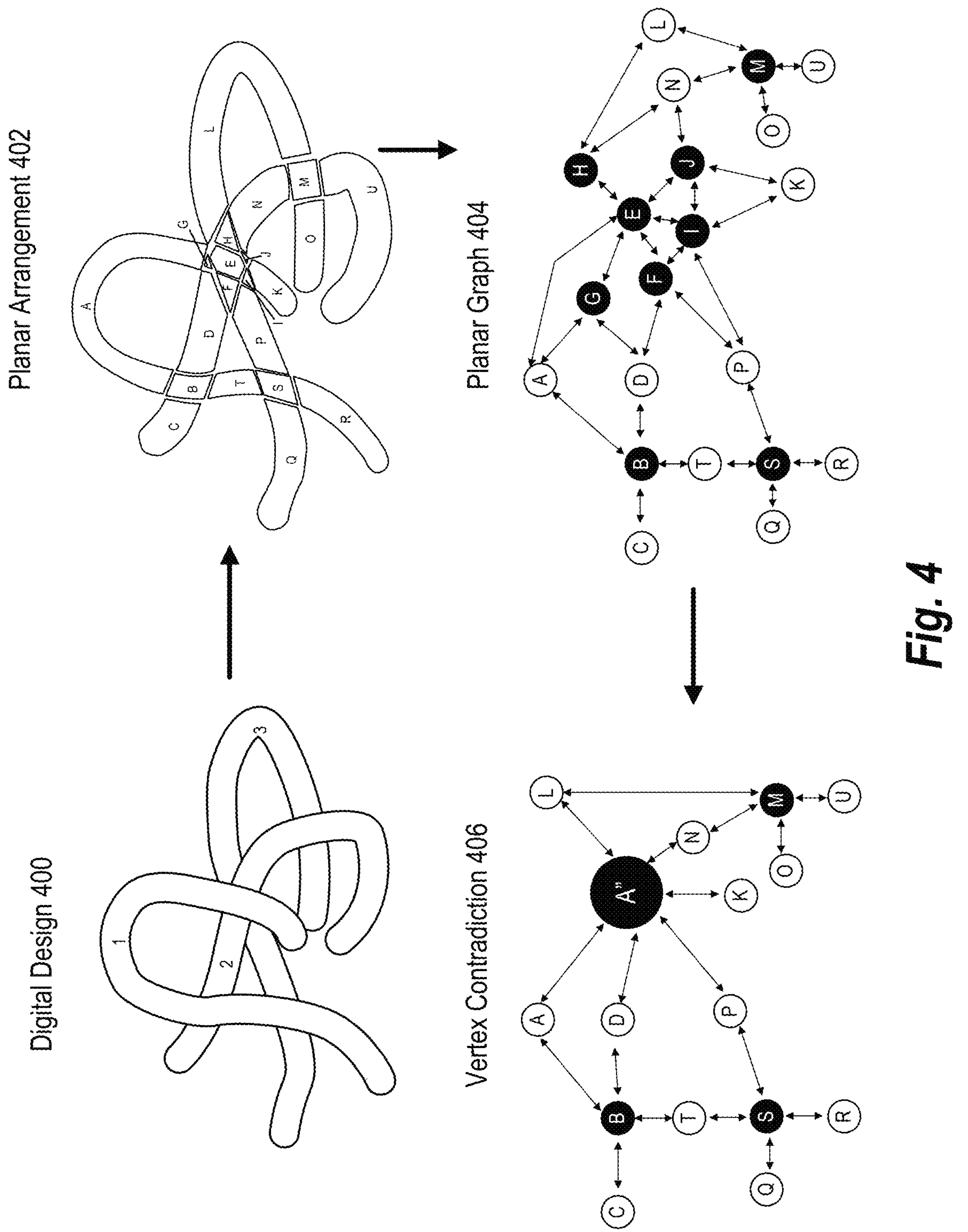
FIG. 4 illustrates a process flow of generating a planar graph of the objects in a digital design in accordance with one or more embodiments.

As mentioned above, in some embodiments, the structure aware intertwining system 102 generates a planar graph of objects in a digital design. For example, FIG. 4 illustrates a process flow of generating a planar graph 404 of the objects in digital design 400 in accordance with one or more embodiments. Specifically, in some implementations, the structure aware intertwining system 102 generates a planar arrangement 402 of the digital design 400. Further, in one or more embodiments, the structure aware intertwining system 102 uses the planar arrangement 402 to generate the planar graph 404. Additionally, in one or more implementations, the structure aware intertwining system 102 performs a vertex contraction 406 of the planar graph 404.

As mentioned above, in some embodiments, the structure aware intertwining system 102 generates a planar arrangement 402 of the digital design 400. For example, the structure aware intertwining system 102 generates the planar arrangement 402 of the three objects in the digital design 400 using the object outlines generated as discussed above with respect to FIGS. 3A and 3B. Further, the structure aware intertwining system 102 generates the planar arrangement to include planar faces of the objects and edges between planar faces.

To illustrate, the structure aware intertwining system 102 generates the planar arrangement 402 to include planar faces A, B, C, etc. Additionally, in these or other embodiments, at locations where two objects intersect, the planar faces are connected with edges. For instance, at the planar face B where object 1 and object 2 intersect, the planar face B is connected to four adjacent planar faces (e.g., A, C, D, and T) with an edge between B and each planar face. Indeed, the structure aware intertwining system 102 generates an edge between each of planar faces B and A, B and C, B and D, and B and T.

As noted above, in one or more embodiments, the structure aware intertwining system 102 uses the planar arrangement 402 to generate the planar graph 404. For example, in some implementations, the structure aware intertwining system 102 generates a planar graph that represents the planar faces of objects as vertices and object paths between the overlapping surfaces as edges. In particular, in one or more implementations, the structure aware intertwining system 102 generates a vertex in the planar graph 404 for each planar face of the planar arrangement 402 and retains the edges connecting the vertices. For example, the structure aware intertwining system 102 generates the planar graph 404 with vertices A, B, C, etc. and each of the adjacent vertices are connected with an edge. For instance, in the planar graph 404, vertex A is connected with an edge to vertex B, with an additional edge to vertex G, and with a third edge to vertex E.

Further, in some embodiments, the structure aware intertwining system 102 generates an overlapping surface vertex group by determining which of the vertices correspond to overlapping surfaces of the objects in the digital design 400. Indeed, the structure aware intertwining system 102 generates the overlapping surface vertex group to include all of the vertices corresponding to overlapping surfaces of the objects. In other words, the structure aware intertwining system 102 generates the overlapping surface vertex group to include the vertices corresponding to planar faces of the objects at overlapping surfaces of the objects. For instance, the structure aware intertwining system 102 generates the overlapping surface vertex group including each of the shaded vertices (i.e., B, E, F, G, H, I, J, M, and S) of the planar graph 404. In this example, the shaded vertices correspond to the planar faces of the same letters at overlapping surfaces of the objects as illustrated in the planar arrangement 402.

In some implementations, the structure aware intertwining system 102 generates the planar graph 404 from the planar arrangement 402 using a variety of functions. In one or more embodiments, for each planar face $f_i$ the structure aware intertwining system 102 generates a vertex $V_i$. Moreover, in one or more implementations, the structure aware intertwining system 102 connects adjacent faces with an edge e in the planar graph 404 G. Formally, G=(V, E) is a graph containing an edge e=(u, v) with u≠v, u and v corresponds to adjacent faces in a planar graph. Additionally, in some embodiments, the structure aware intertwining system 102 generates the planar graph 404 such that the weight of each edge $w_e$ is 0. Furthermore, the structure aware intertwining system 102 also defines two more functions c(v) and Ω(v) which determine the number of overlapping surfaces contributing to the face corresponding to v, and boundary of the face respectively. Moreover, the shaded vertices of the planar graph 404 denote vertices where more than one object intersects $\Sigma_{>1}$ and the non-shaded vertices denote non-overlapping regions $\Sigma_1$.

Additionally, in one or more implementations, the structure aware intertwining system 102 performs a vertex contraction 406 of the planar graph 404. In these or other embodiments, the structure aware intertwining system 102 contracts adjacent vertices (e.g., vertices sharing an edge) of the overlapping surface vertex group into aggregate vertices. As mentioned above, the structure aware intertwining system 102 determines the overlapping surface vertex group by determining which of the vertices correspond to the overlapping surfaces of the objects.

To illustrate, the structure aware intertwining system 102 contracts vertices E, F, G, H, I, and J of the planar graph 404 into a single aggregate vertex A" as illustrated in the vertex contraction 406. Accordingly, the vertex A" corresponds to the location in the digital design 400 where all three objects intersect at the same location. In this example, none of the remaining shaded vertices (i.e., vertices belonging to the overlapping surface vertex group) such as B, M, or S are adjacent to other vertices of the overlapping surface vertex group and therefore the structure aware intertwining system 102 does not contract them.

In some embodiments, the structure aware intertwining system 102 performs the vertex contraction 406 using a variety of functions. For example, in some implementations, the structure aware intertwining system 102 performs the vertex contraction 406 by merging two vertices u and v. In these or other embodiments, unlike generic vertex contraction, u and v are connected with an edge. This is known as edge contraction, but the structure aware intertwining system 102 performs the vertex contraction 406 semantically at the vertex level.

To illustrate, in one or more embodiments, the structure aware intertwining system 102 defines the contraction operation as follows: let G=(V, E) be a graph containing an edge e=(u, v) with u≠v. Further, let f be a function that maps every vertex in V\{u, v} to itself, and otherwise, maps it to a new vertex w. Moreover, the contraction of e results in a new graph G'=(V', E'), where V'=(V\{u, v})∪{w}, E'=E\{e}, and for every x∉V, x'=f(x)∉V' is incident to an edge e'∉E' if and only if, the corresponding edge, e∉E is incident to x and G. In this and other embodiments, the new graph G' is a graph such as the graph of the vertex contraction 406.

Further, in one or more implementations, the structure aware intertwining system 102 determines which vertices to merge (e.g., which of the vertices of the overlapping surface vertex group to contract). For instance, the structure aware intertwining system 102 divides the vertices V into two groups $\Sigma_1=u_i$ and $\Sigma_{>1}=v_i$ where $c(u_i)=1$ and $c(v_i)>1$. Further, in some embodiments, the structure aware intertwining system 102 detects different sub-group vertices in each of these groups $\Sigma_1$ and $\Sigma_{>1}$. In these or other embodiments, the vertices corresponding to these sub-groups are the vertices $(u_s, u_d)$ such that there exists a path between $(u_s, u_d)$, say $(u_1, u_2 \ldots u_k)$ such that $\forall u_i$ belongs to the same groups. In some implementations, the structure aware intertwining system 102 semantically merges all adjacent faces belonging to more than one component and faces belonging to the single component together. For example, the structure aware intertwining system 102 contracts u, v into w. Thus, the structure aware intertwining system 102 defines two properties c(w) and Ω(w) as follows. For group $\Sigma_1$, c(w)=1.

$$c(w) = c(u) * c(v),\ \forall\ (u, w) \in \sum\nolimits_{>1}$$

$$\Omega(w) = \Omega(u) + \Omega(v)$$

In one or more embodiments, the structure aware intertwining system 102 performs the vertex contraction 406. In one or more implementations, any vertex v may belong to either $\Sigma_1$ or $\Sigma_{>1}$. Starting for u, the structure aware intertwining system 102 visits all the adjacent nodes u* using BFS traversal. In some embodiments, the structure aware intertwining system 102 pushes all the adjacent nodes in u* for traversal if they belong to the same group as u. Furthermore, in some implementations, for vertices belonging to other nodes, the structure aware intertwining system 102 maintains separate list l. In one or more embodiments, at the end of traversal, the structure aware intertwining system 102 applies contraction to the traversed vertices. Further, the structure aware intertwining system 102 moves all the elements in the list l for BFS traversal. In these or other embodiments, the second traversal belongs to the elements of another group. In one or more implementations, the structure aware intertwining system 102 repeats this procedure of collection and contraction of nodes of the two groups alternatively until the structure aware intertwining system 102 visits all the nodes. Accordingly, in these or other embodiments, the structure aware intertwining system 102 generates the contracted planar graph of the vertex contraction 406 from the planar graph 404.

In some embodiments, the structure aware intertwining system 102 need not perform a vertex contraction. For example, some digital designs may not include adjacent vertices of an overlapping surface vertex group. To illustrate, these digital designs may include only two overlapping objects at any given overlap location of the digital design. In these or other embodiments, the structure aware intertwining system 102 performs a vertex removal on a planar graph without performing a vertex contraction.

Figure 5:
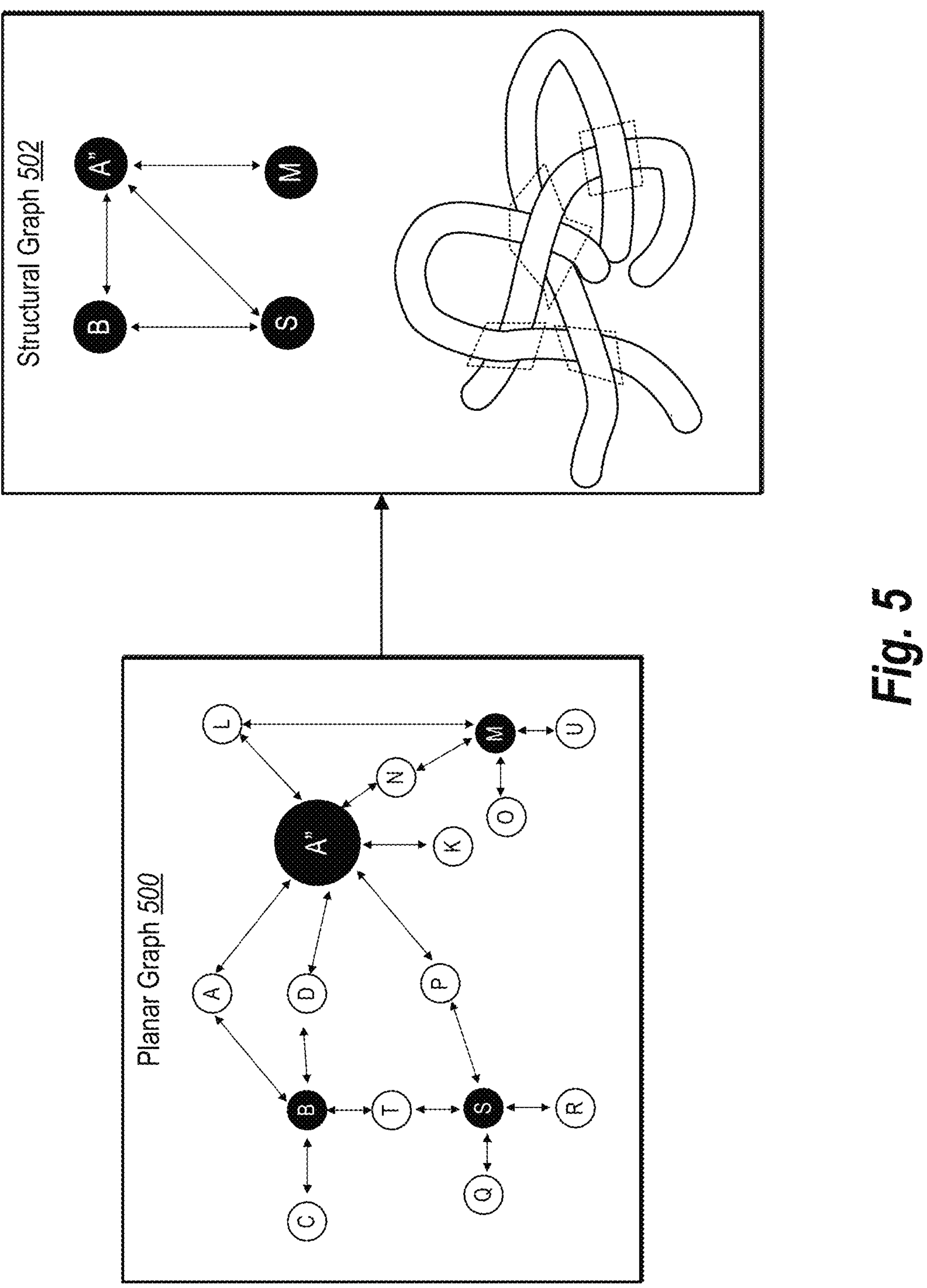
FIG. 5 illustrates a process flow of removing vertices from a planar graph to generate a structural graph in accordance with one or more embodiments.

As mentioned above, in some implementations, the structure aware intertwining system 102 performs a vertex removal on the planar graph. For example, FIG. 5 illustrates a process flow of removing vertices from a planar graph 500 to generate a structural graph 502 in accordance with one or more embodiments. In particular, in one or more embodiments, the structure aware intertwining system 102 removes vertices from the planar graph that are not part of the overlapping surface vertex group.

To illustrate, in one or more implementations, the structure aware intertwining system 102 removes vertices from planar graph 500 to generate structural graph 502. In particular, in some embodiments, the structure aware intertwining system 102 removes the vertices that are not part of the overlapping surface vertex group (e.g., the unshaded vertices A, C, D, K, L, N, O, P, Q, R, T, U). Thus, the structure aware intertwining system 102 generates the structural graph 502 with only the vertices of the overlapping surface vertex group and the edges connecting them.

As just mentioned, the structure aware intertwining system 102 removes the vertices that are not part of the overlapping surface vertex group. Moreover, the structure aware intertwining system 102 adds an edge between the remaining nodes (e.g., A", B, M, and S) if they are connected by a vertex that the structure aware intertwining system 102 removes. To illustrate, when the structure aware intertwining system 102 removes vertex T of planar graph 500, the structure aware intertwining system 102 identifies that Nodes B and S of the structural graph 502 are connectable via the vertex T. Accordingly, when the structure aware intertwining system 102 removes the vertex T, the structure aware intertwining system 102 also adds an edge between nodes B and S in the structural graph 502.

In some embodiments, the structure aware intertwining system 102 generates the structural graph 502 of the digital design wherein the overlapping surfaces of objects in the digital design are represented as nodes and the object paths between the overlapping surfaces are represented as edges. Indeed, the structural graph 502 includes nodes A", B, M, and S and the edges connecting these nodes. In particular, the structural graph 502 includes four edges as follows: nodes A and B share an edge, nodes A and S share an edge, nodes A and M share an edge, and nodes B and S share an edge.

For illustration purposes, a visualization of the original digital design with the three overlapping digital objects is included with structural graph 502 in FIG. 5. Indeed, this visualization includes boxes around each overlapping surface of the objects represented by the nodes of the structural graph 502. Further, the visualization of the original digital design illustrates the shared edges of the structural graph 502. For example, the overlapping surfaces represented by nodes B and S are visually connected by an object path of object 1 and the overlapping surfaces represented by nodes S and A" are visually connected by an object path of object 3. To further illustrate, the overlapping surfaces represented by nodes A" and M are visually connected by two object paths including an object path of object 2 and an object path of object 3. In some implementations, the structure aware intertwining system 102 generates a single edge in the structural graph 502 even when two object paths connect nodes as in the case of nodes A" and M.

Furthermore, in one or more embodiments, the structure aware intertwining system 102 removes the vertices as described above using specific operations. For example, in one or more implementations, the structure aware intertwining system 102 removes all the vertices in G' with c(u)=1. Additionally, the structure aware intertwining system 102 also removes all the edges incident on u. Moreover, in some embodiments, via this deletion, the structure aware intertwining system 102 generates structural graph 502 $G_s$=(V", E") where V"=(V'−u), E"=E'−$E_u$+$E_w$. $E_u$ is the set of all the edges which are incident on u. for example, the structure aware intertwining system 102 defines those edges in $E_u$=u, $v_i$. Further, in one or more implementations, $E_w$ are the new edges connecting every possible pair of vertices in $v_i$. In some implementations, the structure aware intertwining system 102 defines the weight of these edges with the area of boundary region of deleted nodes u.

$$W(E_{w_i}) = \Omega(u)$$

Accordingly, the structural graph 502 ($G_s$) represents the connectivity of overlapping areas of the overlapping objects of the digital design. Thus, the structure aware intertwining system 102 generates the structural graph 502 to represent every node corresponding to merged overlapping areas, and the two nodes to be adjacent if there is any visual connectivity between them. Moreover, the structure aware intertwining system 102 utilizes this property of structural graph 502 for visual order assignment for intertwining as discussed with respect to FIG. 6.

Figure 6:
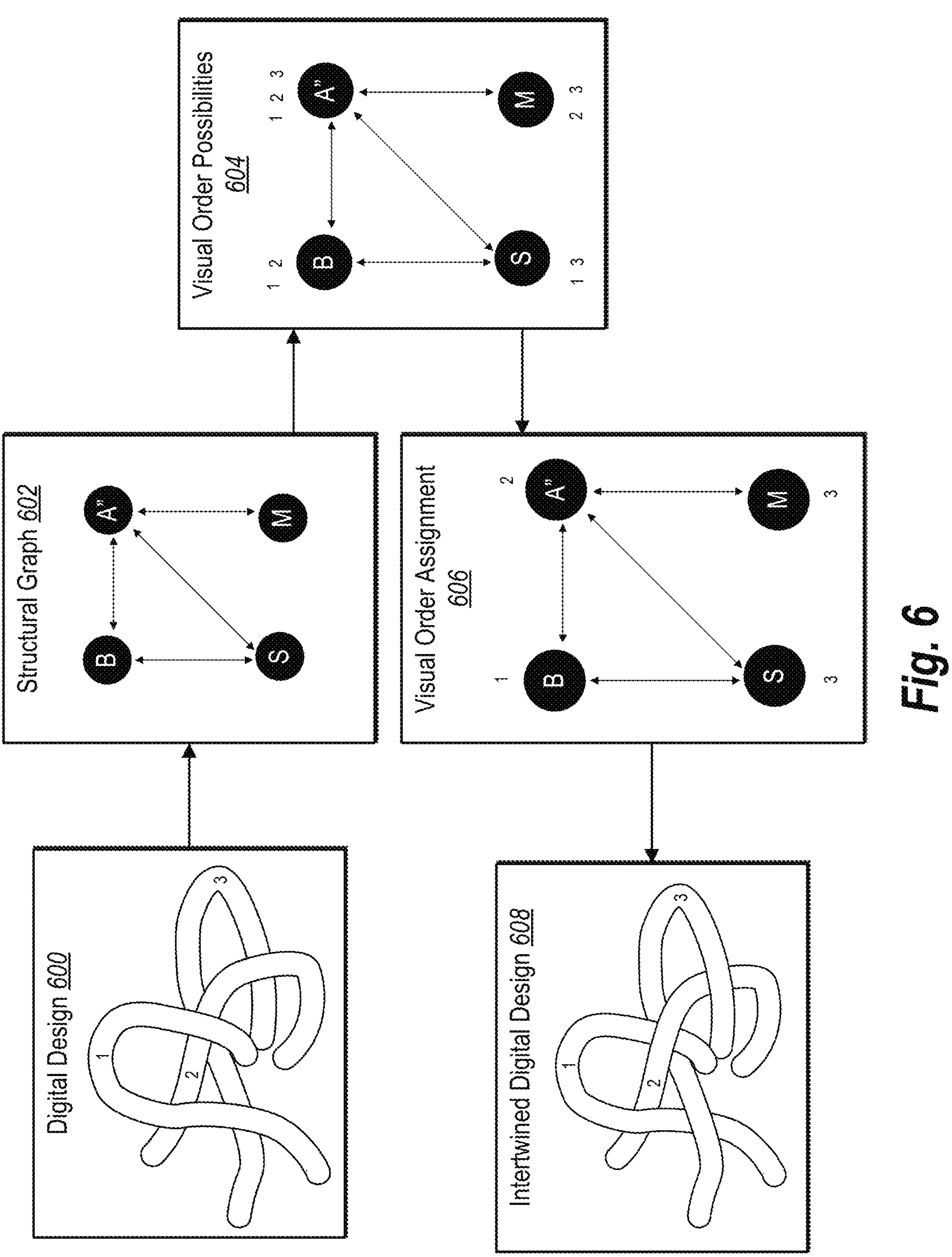
FIG. 6 illustrates a process flow of assigning a visual order to nodes of a structural graph of a digital design in accordance with one or more embodiments.

As mentioned above, in some embodiments, the structure aware intertwining system 102 assigns a visual order of the objects at each node of the structural graph. For example, FIG. 6 illustrates a process flow of assigning a visual order to nodes of a structural graph 602 of a digital design 600 in accordance with one or more embodiments. Specifically, in some implementations, the structure aware intertwining system 102 generates a structural graph 602 of the objects in the digital design 600. Further, in one or more embodiments, the structure aware intertwining system 102 determines visual order possibilities 604 for each node of the structural graph 602. Moreover, in one or more implementations, the structure aware intertwining system 102 performs a visual order assignment 606 for the nodes of the structural graph 602. Additionally, in some embodiments, the structure aware intertwining system 102 generates an intertwined digital design (e.g., intertwined image 608) by ordering the overlapping surfaces of the objects in accordance with the assigned visual order of the nodes. As mentioned above, in some embodiments, the structure aware intertwining system 102 generates a structural graph 602 of the objects in the digital design 600. For example, the structure aware intertwining system 102 generates the structural graph 602 using similar methods to those described above with respect to FIGS. 2-5. Further, in one or more embodiments, the structure aware intertwining system 102 determines the visual order possibilities 604 for each node of the structural graph 602. In other words, the structure aware intertwining system 102 determines which objects overlap at each overlapping surface of the objects represented by the nodes of the structural graph 602. Indeed, each object at each overlapping surface is a possible option for visual order assignment at the corresponding node.

To illustrate, the structure aware intertwining system 102 determines that at node A" of the structural graph 602, any one of the three objects is available for assignment because all three objects intersect at the overlapping surface corresponding to node A". Further, at node B, the structure aware intertwining system 102 determines that either object 1 or object 2 is available for assignment, at node S, either object 1 or object 3 is available for assignment, and at node M, either object 2 or object 3 is available for assignment. In FIG. 6, these visual order possibilities are illustrated by the shaded boxes adjacent to the nodes of the structural graph of the visual order possibilities 604 graphic.

Moreover, in one or more implementations, the structure aware intertwining system 102 performs the visual order assignment 606 for the nodes of the structural graph 602. For example, in some embodiments, the structure aware intertwining system 102 assigns a visual order to the nodes based on the configuration of the structural graph. More specifically, in some implementations, the structure aware intertwining system 102 assigns the visual order to the nodes utilizing a heuristic that causes adjacent overlapping areas of the digital design to have different objects on top and seeks to achieve intertwining symmetry.

To illustrate, in one or more embodiments, the structure aware intertwining system 102 performs the visual order assignment 606 by assigning different objects to adjacent nodes as shown in the visual order assignment 606. Indeed, in these or other embodiments, the structure aware intertwining system 102 assigns object 2 to node A", object 1 to node B, and object 3 to nodes M and S. Thus, the structure aware intertwining system 102 assigns the visual order to each node according to the heuristic described above. For example, the structure aware intertwining system 102 does not assign any two adjacent nodes (i.e., nodes sharing an edge) the same visual order of objects.

To further illustrate, in one or more implementations, the structure aware intertwining system 102 follows a series of operations to assign the visual order to the nodes. For example, in some embodiments, the structure aware intertwining system 102 determines a first node with which to begin the visual order assignment 606 and assigns a visual order to the first node. Additionally, in one or more embodiments, the structure aware intertwining system 102 identifies adjacent nodes to the first node for visual order assignment and assigns a visual order to these nodes different from the visual order of the first node. In one or more implementations, the structure aware intertwining system 102 continues identifying adjacent nodes and assigning a visual order to the nodes until all nodes are assigned a visual order. In some instances, the structure aware intertwining system 102 will be unable to assign a unique visual order at a node according to the heuristic. In these or other embodiments, the structure aware intertwining system 102 skips over the node leaving the original order in place.

As mentioned, in some embodiments, the structure aware intertwining system 102 determines a first node with which to begin the visual order assignment. In some implementations, the structure aware intertwining system 102 determines the first node by identifying, from among the nodes, a node having the highest number of adjacent nodes or a node having the highest number of possible visual orders (i.e., visual order possibilities). To illustrate, the structure aware intertwining system 102 determines node A" of the structural graph 602 as the first node using either of these criteria. Node A" has the highest number of adjacent nodes because it shares an edge with each of nodes B, M, and S. Further, node A" has the highest number of possible visual orders because any of the three objects are available for assignment as illustrated in graph of the visual order possibilities 604. In one or more embodiments, the structure aware intertwining system 102 determines the first node by determining and selecting the node with the least number of possible visual orders. Further, in some implementations, the structure aware intertwining system 102 uses other criteria for determining the first node.

As discussed above, in some implementations, the structure aware intertwining system 102 assigns a visual order to the first node. To illustrate, the structure aware intertwining system 102 assigns object 2 to the first node, A", as shown in the graph of the visual order assignment 606. Specifically, in one or more embodiments, the structure aware intertwining system 102 utilizes a variety of mechanisms to determine which object to assign (i.e., what visual order to assign) to each node. For instance, in one or more implementations, the structure aware intertwining system 102 assigns a visual order priority to each of the objects and assign a visual order to each node using the visual order priority. To illustrate, the structure aware intertwining system 102 assigns a first visual order priority to object 2, a second visual order priority to object 3, and a third visual order priority to object 1. In these or other embodiments, the structure aware intertwining system 102 assigns the objects at each node according to this priority. Indeed, the structure aware intertwining system 102 assigns the object with the first visual order priority (e.g., object 2) to the first node (e.g., A" is assigned object 2).

To continue the above illustration, in one or more embodiments, the structure aware intertwining system 102 then assigns a visual order to the nodes adjacent to the first node using the visual order priority and the above described heuristic wherein the structure aware intertwining system 102 assigns different visual orders to adjacent nodes. For example, in these or other embodiments, the structure aware intertwining system 102 assigns object 3 (having the second visual order priority) to nodes M and S each of which are adjacent to node A" and therefore each of which cannot be assigned object 2 (having the first visual order priority). Importantly, nodes M and S are not adjacent to one another (because they do not share an edge) and therefore the structure aware intertwining system 102 assigns object 3 to both. Furthermore, the structure aware intertwining system 102 assigns object 1 (having the third visual order priority) to node B which is adjacent to both nodes A" (assigned object 2) and S (assigned object 3) and therefore cannot be assigned either the dark or object 2 according to the heuristic.

The structure aware intertwining system 102 assigns the visual orders to the nodes of the structural graph 602 using a variety of algorithms. In one or more embodiments, the structure aware intertwining system 102 assigns the visual order $V_o$ to every possible overlapping area of the objects of the digital design 600. In these or other embodiments, all the nodes of the structural graph 602 ($G_s$) represent that overlapping area, $\Omega(v)$. Further, in these or other embodiments, the structure aware intertwining system 102 applies the heuristic that adjacent overlapping areas should have different objects on top (i.e., in front) for an aesthetic intertwining appearance in the intertwined digital design (e.g., the intertwined image 608). Further, in these or other embodiments, this heuristic helps achieve symmetrical intertwining effects wherever possible.

In some embodiments, the structure aware intertwining system 102 maps the problem of intertwining objects to a graph coloring problem with some additional constraints. In these or other embodiments, the structure aware intertwining system 102 defines this as a coloring problem, followed by an algorithm to solve that coloring problem. Further, the structure aware intertwining system 102 uses these results for defining an intertwine operation. For example, in one or more embodiments, the structure aware intertwining system 102 uses the following algorithm:

Algorithm 1 Constrained Coloring

```
1:  procedure GETSTARTNODE(G_s)
2:      for each v in V do
3:          if ||K(v)|| > 1 then ▷ This denotes number of element in
                                  |K(v)| return v
      return Ø
4:  procedure CANASSIGN(v, k)
5:      u* ← adjacent nodes of v
6:      for each u in u* do
7:          if u is visited and ω(v) == k then return false
      return true
8:  procedure COLORING(G_s)
9:      s ← GETSTARTNODE(G_s)
10:     Q ← s                       ▷ BFS traversal, Q represents queue
11:     while Q is not empty do
12:         v ← pop Q
13:         for each k in |K(v)| do
14:             if CANASSIGN(v, k) then
15:                 ω(v) ← k
16:                 break
17:         mark v visited.
18:         push all adjacent non-visited nodes of v
```

In some implementations, the structure aware intertwining system 102 performs the problem mapping beginning with assigning to each object of the digital design 600 (also referred to as intertwine components) $I_i$ a unique local identifier id. In one or more embodiments, the structure aware intertwining system 102 uses bit mask sequential identifier i.e., $id_i=2^i$. Accordingly, in these or other embodiments, the structure aware intertwining system 102 maps every component to a color whose value is equal to $id_i$. Further, the structure aware intertwining system 102 stores in every vertex (i.e., node of the structural graph) the information of the objects which pass through its region 22. In one or more implementations, the structure aware intertwining system 102 stores that information in a single number K(v), where each on bit $b_i$ denotes component $I_i$ passing through the boundary of the vertex. Further, in some embodiments, the structure aware intertwining system 102 represents |K(v)| as the set of all components belonging to v. In these or other embodiments, the problem is one of assigning a color ω(v) to each vertex v which satisfies the following constraints, where $u_i$ represents an adjacent vertex of v:

$$\omega(v) \in |K(v)|$$

$$\omega(v) \notin |K(u_i)|$$

The graph of the visual order possibilities 604 shows the possible intertwine components (i.e., objects of the digital design) which the structure aware intertwining system 102 can assign to that vertex.

As mentioned above, in some embodiments, the structure aware intertwining system 102 solves the coloring problem using an algorithm. For example, in some implementations, the structure aware intertwining system 102 uses the greedy algorithm for color assignment (i.e., assigning the visual order).

For example, in these or other embodiments, the structure aware intertwining system 102 begins with the node having maximum adjacency (i.e., the maximum number of adjacent nodes) or a maximum number of visual order options, as described previously. Further, in these or other embodiments, the structure aware intertwining system 102 assigns the first object available for assignment to this first node. Moreover, in some embodiments, the structure aware intertwining system 102 performs a breadth-first traversal of the structural graph 602 and assigns visual orders to adjacent nodes wherever possible. Indeed, this process is detailed in algorithm 1 as described above.

Further, in one or more implementations, after assigning the color, the structure aware intertwining system 102 applies a Binary Operation (⊕), which is representable as:

$$\text{Binary } [V \oplus (A_{key}, D)]$$

where: $A_{key}$ represents one of the objects of the digital design (e.g., objects 1, 2, or 3); and a visual order V of $A_{key}$ is changed in a direction guided by parameter D (also referred to herein as direction D) with reference to vector object $A_i$ which is a different object of the digital design objects (e.g., object 1, 2, or 3). As shown in the exemplary binary operation ⊕ above, the structure aware intertwining system 102 need not specify a reference vector object $A_i$. Rather, the structure aware intertwining system 102 determines the reference vector object automatically based on the current visual order. In these or other embodiments, the operators for those operations are Ω(v), Intertwine corresponding to ω(v), and direction D is "Send to Front." In some implementations, the structure aware intertwining system 102 applies the intertwine operation for the regions which has some color (i.e., visual order) assigned. The structure aware intertwining system 102 displays the result (e.g., intertwined image 608) after applying automatic intertwine to the digital design 600 based on the visual order assignment 606.

As mentioned previously, in some embodiments, the structure aware intertwining system 102 generates an intertwined digital design (e.g., the intertwined image 608) by ordering the overlapping surfaces of the objects in the digital design 600 in accordance with the assigned visual order of the nodes. For example, the structure aware intertwining system 102 orders the overlapping surfaces of the objects of the digital design 600 according to the visual order assignment 606 of the corresponding nodes.

To illustrate, the structure aware intertwining system 102 orders the overlapping surface corresponding to node A" of the structural graph 602 to have object 2 on top in the intertwined image 608 according to the visual order assignment 606 as opposed to object 1 in the digital design 600. Further, in the intertwined image 608, the structure aware intertwining system 102 orders the overlapping surfaces corresponding to nodes M and S to have object 3 on top, and the overlapping surface corresponding to node B to have object 1 on top, each according to the visual order assignment 606. Thus, the structure aware intertwining system 102 generates the intertwined image 608 from the digital design 600. In contrast to the intertwined image 608, the digital design 600 displays the objects such that object 1 is always on top (i.e., in front), object 2 is always beneath (or behind) object 1 but above (or in front of) object 3, and object 3 is always on bottom (i.e., behind the other objects).

Figure 7A:
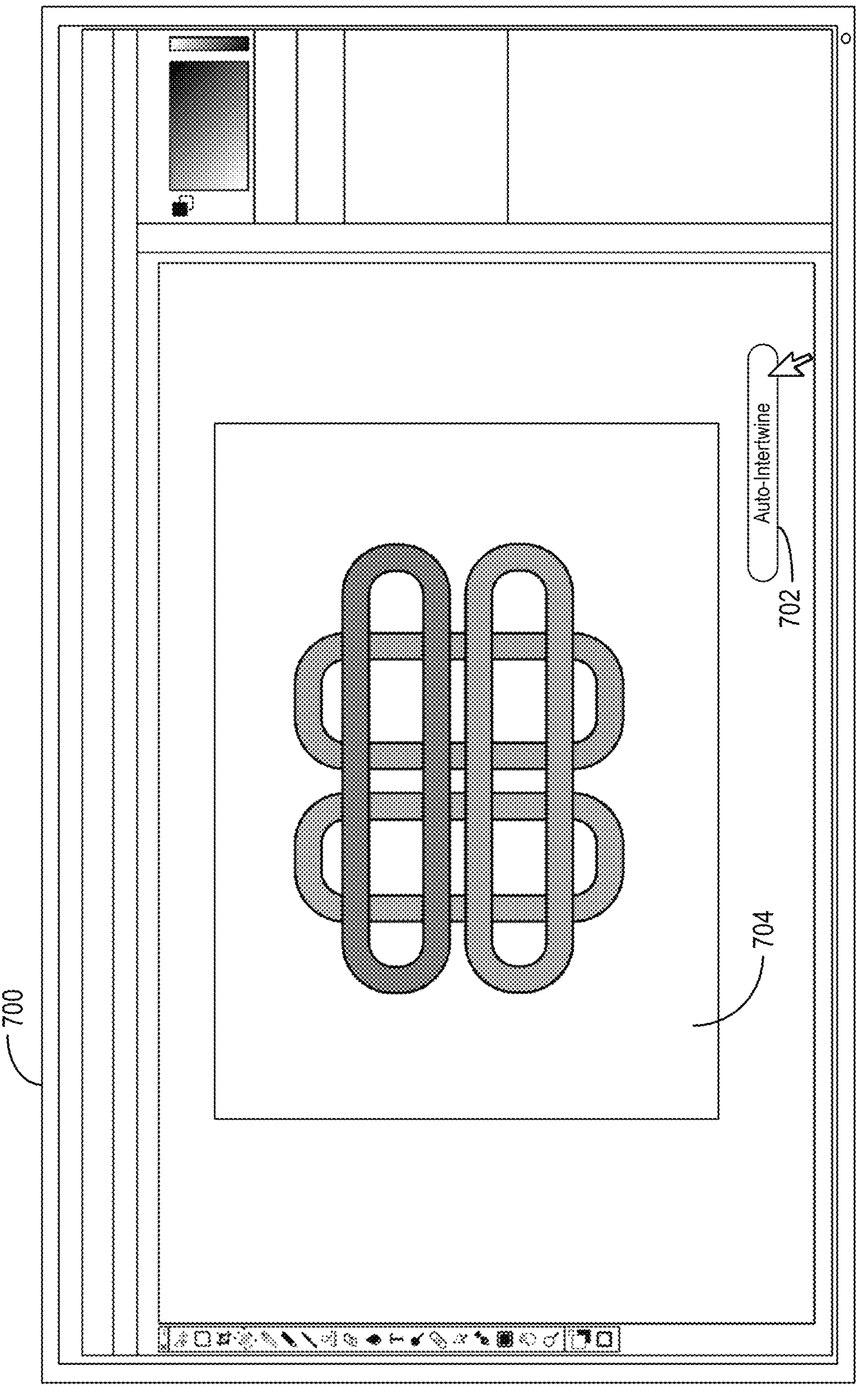
FIGS. 7A-7C illustrate a series of graphical user interfaces showing a process of generating an assisted intertwined digital design in a graphical user interface in accordance with one or more embodiments.
Figure 7B:
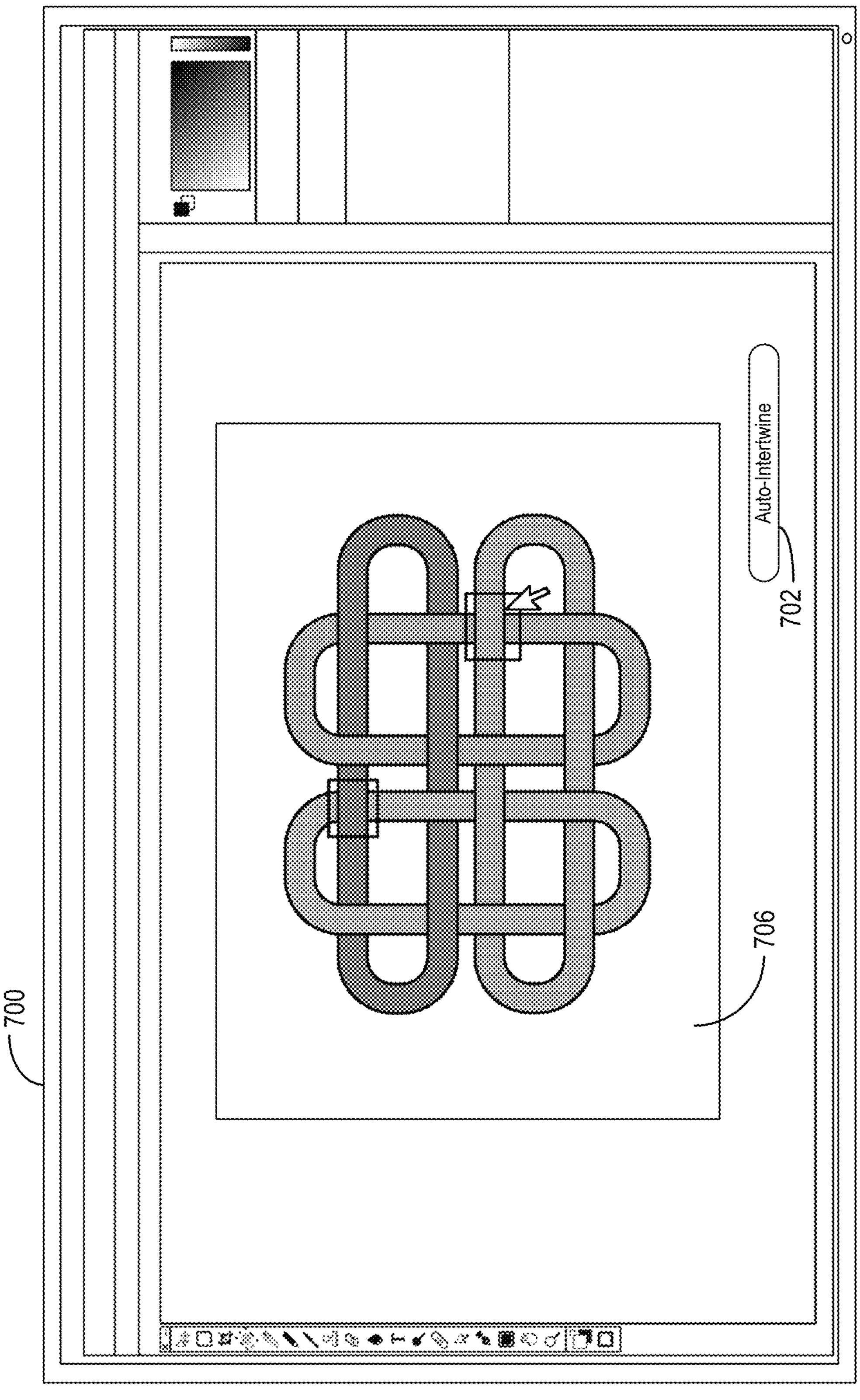
Figure 7C:
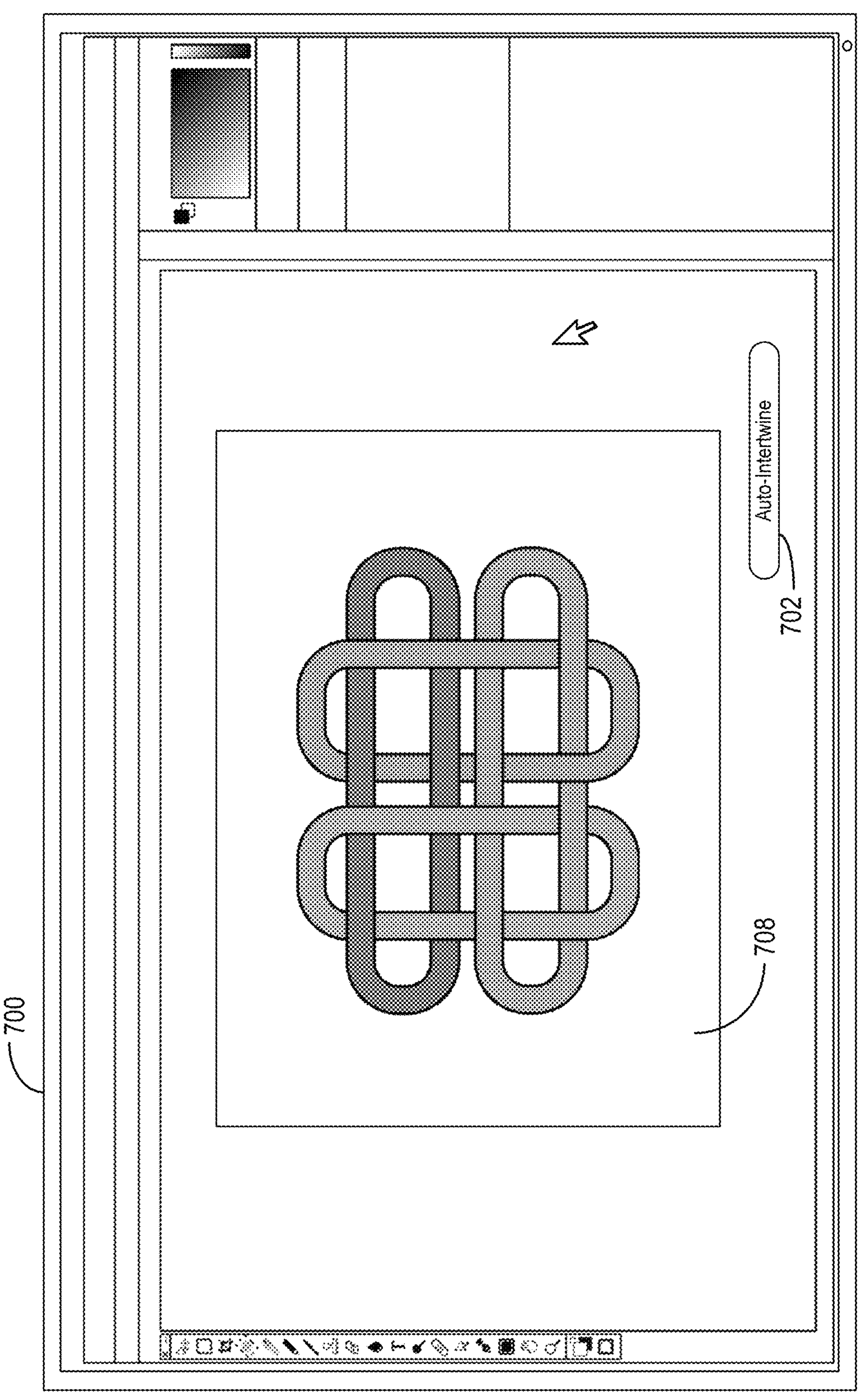

As mentioned previously, in some embodiments, the structure aware intertwining system 102 receives user input specifying a visual order of the objects at a node and reorders the assigned visual order of the remaining nodes to generate an assisted intertwined digital design. For example, FIGS. 7A-7C illustrate a process flow generating an assisted intertwined digital design 708 in a graphical user interface in accordance with one or more embodiments. Specifically, in some embodiments, the structure aware intertwining system 102 generates a graphical user interface 700 including an auto-intertwine element 702 for receiving user input to modify a digital design 704. Moreover, in one or more implementations, the structure aware intertwining system 102 generates an intertwined digital design (e.g., intertwined image 706) from the digital design 704. Further, in some implementations, the structure aware intertwining system 102 receives (e.g., via the graphical user interface 700 of a user device) and utilizes user input to generate an assisted intertwined digital design 708.

As just mentioned, in one or more embodiments, the structure aware intertwining system 102 generates an intertwined digital design such as the intertwined image 706 from a digital design 704. As illustrated in FIG. 7A, the digital design 704 includes four objects with two objects in front of (or on top of) two other objects. Indeed, the digital design 704 lacks any intertwining of objects. In one or more implementations, the structure aware intertwining system 102 utilizes some or all of the methods discussed above with respect to FIGS. 2-6 to generate the intertwined image 706. For example, the structure aware intertwining system 102 receives user input via the auto-intertwine element 702. Further, in these or other embodiments, in response to receiving the user input via the auto-intertwine element 702, the structure aware intertwining system 102 generates the intertwined image 706, for instance as illustrated in FIG. 7B. Indeed, the intertwined image 706 illustrates an intertwined digital design wherein the structure aware intertwining system 102 orders the overlapping surfaces of the objects to have different objects on top at adjacent overlapping surfaces (e.g., which correlate to nodes in a structural graph as previously discussed).

As mentioned above, in some embodiments, the structure aware intertwining system 102 receives and utilizes user input (e.g., via the graphical user interface 700 of a user device) to generate an assisted intertwined digital design 708. For example, FIG. 7B illustrates the structure aware intertwining system 102 receiving user input at one or both locations shown by the two rectangles, each encompassing an overlapping surface of the objects. In this example, the structure aware intertwining system 102 receives user input (e.g., via a user indication such as a mouse click) indicating a user assigned visual order of one or both of these specific overlapping surfaces of the objects different from the visual order of the intertwined image 706. In other words, the structure aware intertwining system 102 receives the user input indicating a change in the visual order at the specified overlapping surfaces.

To further illustrate, the structure aware intertwining system 102 generates the assisted intertwined digital design 708, as illustrated in FIG. 7C, utilizing user input. For example, the structure aware intertwining system 102 changes the visual order at the two specified overlapping surfaces according to user input (indicated by the rectangles overlaid on the objects shown in FIG. 7B) as shown in the assisted intertwined digital design 708. Further, in these or other embodiments, the structure aware intertwining system 102 reorders the remaining overlapping surfaces of the objects in accordance with the user assigned visual order of the specified overlapping surfaces of the objects. More specifically, the structure aware intertwining system 102 utilizes the heuristic that causes adjacent overlapping areas to have different objects on top and seeks to achieve intertwining symmetry to reorder the visual order of the remaining overlapping surfaces relative to the changed overlapping surfaces specified in the user input. Additionally, in some implementations, the structure aware intertwining system 102 leaves the changes to the visual order at the two specified overlapping surfaces even if those changes do not align with the changes to adjacent overlapping surfaces. For example, although the structure aware intertwining system 102 generates the assisted intertwined digital design 708 using the heuristic, the structure aware intertwining system 102 generates the assisted intertwined digital design such that some adjacent overlapping areas have the same object in front because of the changes made in response to the user input.

In this manner, in one or more implementations, the structure aware intertwining system 102 generates the assisted intertwined digital design 708. In particular, in these or other embodiments, the structure aware intertwining system 102 generates the assisted intertwined digital design 708 to have an intertwined appearance by ordering adjacent overlapping surfaces of the objects with different objects. Thus, in these or other embodiments, the structure aware intertwining system 102 generates the intertwined image 706 and the assisted intertwined digital design 708 to each have the objects intertwined but does so with different orderings of objects at the various overlapping surfaces.

Moreover, in one or more implementations, the structure aware intertwining system 102 changes the visual order of each overlapping region in response to receiving the user input. Further, in these or other embodiments, the structure aware intertwining system 102 changes the visual order using an algorithm such as Algorithm 2 (i.e., Assistive constrained coloring) as shown below. For example, in these or other embodiments, the structure aware intertwining system 102 treats the user input assigning a new visual order to a given node as a constrained color assignment of that node/overlapping surface. In other words, the structure aware intertwining system 102 will not assign any other color to that node. Indeed, for constrained color assignments, the structure aware intertwining system 102 assigns ω*(v) automatically.

| Algorithm 2 Assistive Constrained Coloring | |
|---|---|
| 1: | procedure CANASSIGN(v, k) |
| 2: | u* ← adjacent nodes of v |
| 3: | for each u in u* do |
| 4: | if u is visited and ω (v) == k then return false |
| 5: | if ω*(v) == k then return false |
| | return true |

As mentioned above, in various embodiments the structure aware intertwining system 102 intertwines all overlap locations, a percentage of the overlap locations, or skips over locations that fail to meet a threshold distance from a previously intertwined location. For example, in one or more embodiments, the structure aware intertwining system 102 assigns a visual order to a set percentage of nodes corresponding to the object overlap locations of a digital design. Further, in one or more implementations, the structure aware intertwining system 102 assigns a visual order to some nodes but not others based on a determination of the surface area between nodes.

As just mentioned, in some embodiments, the structure aware intertwining system 102 assigns a visual order to a set percentage of nodes. For example, in these or other embodiments, the structure aware intertwining system 102 receives a user input (e.g., via a user interface of a client device) setting the percentage of nodes to be assigned a visual order. Further, in some implementations, the structure aware intertwining system 102 uses an algorithm to assign a visual order to the set percentage of nodes. For example, in these or other embodiments, the structure aware intertwining system 102 uses algorithm 2 by using the set percentage as k. In these or other embodiments, this promotes "sparse intertwining" when k is below a 50% threshold. Indeed, in these or other embodiments, the structure aware intertwining system 102 utilizes sparse intertwining to give the intertwined digital design a unique appearance (e.g., a more random intertwining appearance or a less intertwined appearance).

Moreover, in some implementations, the structure aware intertwining system 102 determines which nodes to assign a visual order to meet the set percentage using a variety of mechanisms. In one or more embodiments, the structure aware intertwining system 102 determines which of the nodes to assign with a visual order by determining the weights of the nodes. In these or other embodiments, a node has a greater weight where the surface area between the node and adjacent nodes is larger. Accordingly, in these or other embodiments, the structure aware intertwining system 102 identifies a number of the top weighted nodes to meet the set percentage and assign a visual order to these top weighted nodes while not assigning a visual order to the remaining nodes.

As mentioned above, in one or more embodiments, the structure aware intertwining system 102 assigns a visual order to some nodes but not others based on a determination of the surface area of the digital design between nodes. For example, in these or other embodiments, the structure aware intertwining system 102 assigns a visual order to a first node but not to a second node adjacent to the first node. Specifically, in these or other embodiments, the structure aware intertwining system 102 determines that the surface area of the digital design between the first node and the second node fails to meet a threshold surface area size. Indeed, in one or more implementations, the structure aware intertwining system 102 receives the value for the threshold surface area via user input or the structure aware intertwining system 102 uses an algorithm to determine this value.

Further, in some embodiments, the structure aware intertwining system 102 assigns a visual order to some nodes but not others based on determining relative surface areas between various nodes. In particular, in these or other embodiments, the structure aware intertwining system 102 determines the digital design surface areas between several adjacent nodes. In one example, the structure aware intertwining system 102 determines that the surface area between two nodes is much smaller than the surface area between other adjacent nodes of the digital design. In these or other embodiments, the structure aware intertwining system 102 does not assign a visual order to one of the two nodes separated by the much smaller surface area. In some implementations, the structure aware intertwining system 102 determines the threshold relative surface area size by user input or using an algorithm with a preset threshold. In this manner, the structure aware intertwining system 102 preserves an intertwined appearance in the intertwined digital design by skipping over nodes that are too close together to be perceived as having an intertwine effect in the intertwined digital design.

As mentioned above, in one or more embodiments, the structure aware intertwining system 102 generates and provides multiple intertwine options with different visual ordering of the overlapping surfaces for visualization and selection with minimal interactions (e.g., a single interaction). More specifically, the structure aware intertwining system 102 generates multiple alternative intertwined digital designs with different visual orderings by reordering the overlapping surfaces of the objects. For example, in one or more implementations, the structure aware intertwining system 102 generates an intertwined digital design with visual ordering of the overlapping surfaces of the objects to have an intertwined appearance. Additionally, in these or other embodiments, the structure aware intertwining system 102 also generates an alternative intertwined digital design.

To illustrate, the structure aware intertwining system 102 generates the alternative intertwined digital design by reordering the overlapping surfaces of the objects in accordance with an alternative assigned visual order of the nodes. Indeed, in these or other embodiments, the structure aware intertwining system 102 generates an alternative assigned visual order of the nodes that is different from the visual order of the nodes in the first intertwined digital design. Thus, in some embodiments, the structure aware intertwining system 102 generates multiple alternative intertwined digital designs for a single original digital design in which the alternative intertwined digital designs each exhibit intertwining of the objects but do so in different ways. Moreover, in some implementations, the structure aware intertwining system 102 generates many different alternative intertwined digital designs for visualization and selection. Indeed, for more complex digital designs (e.g., digital designs having many overlapping objects and/or digital designs with many overlapping surfaces between objects), the structure aware intertwining system 102 generates many different intertwined digital design possibilities (i.e., intertwine options).

Figure 8A:
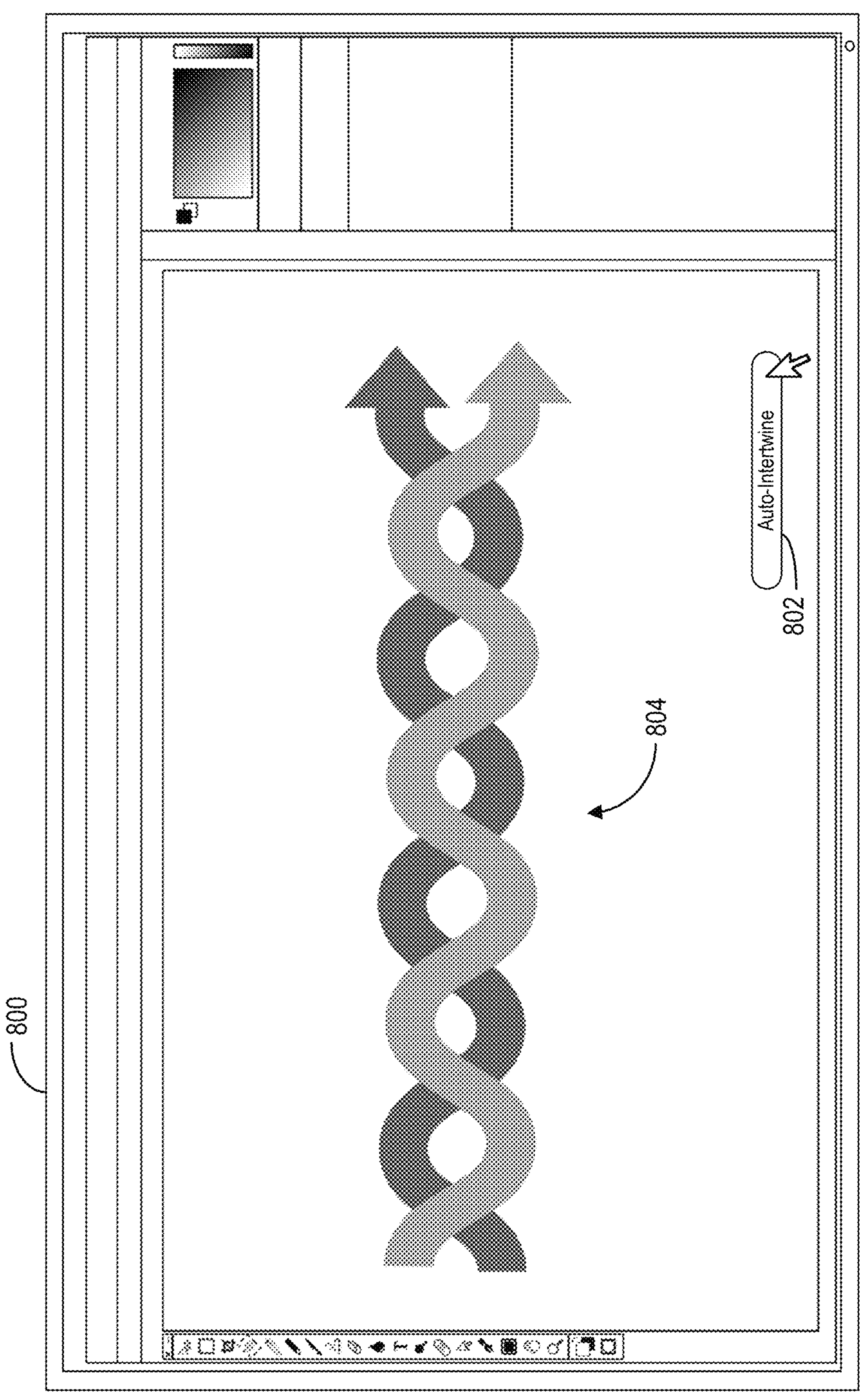
FIGS. 8A and 8B illustrate a series of graphical user interfaces showing a process flow of generating an intertwined digital design in accordance with one or more embodiments.
Figure 8B:
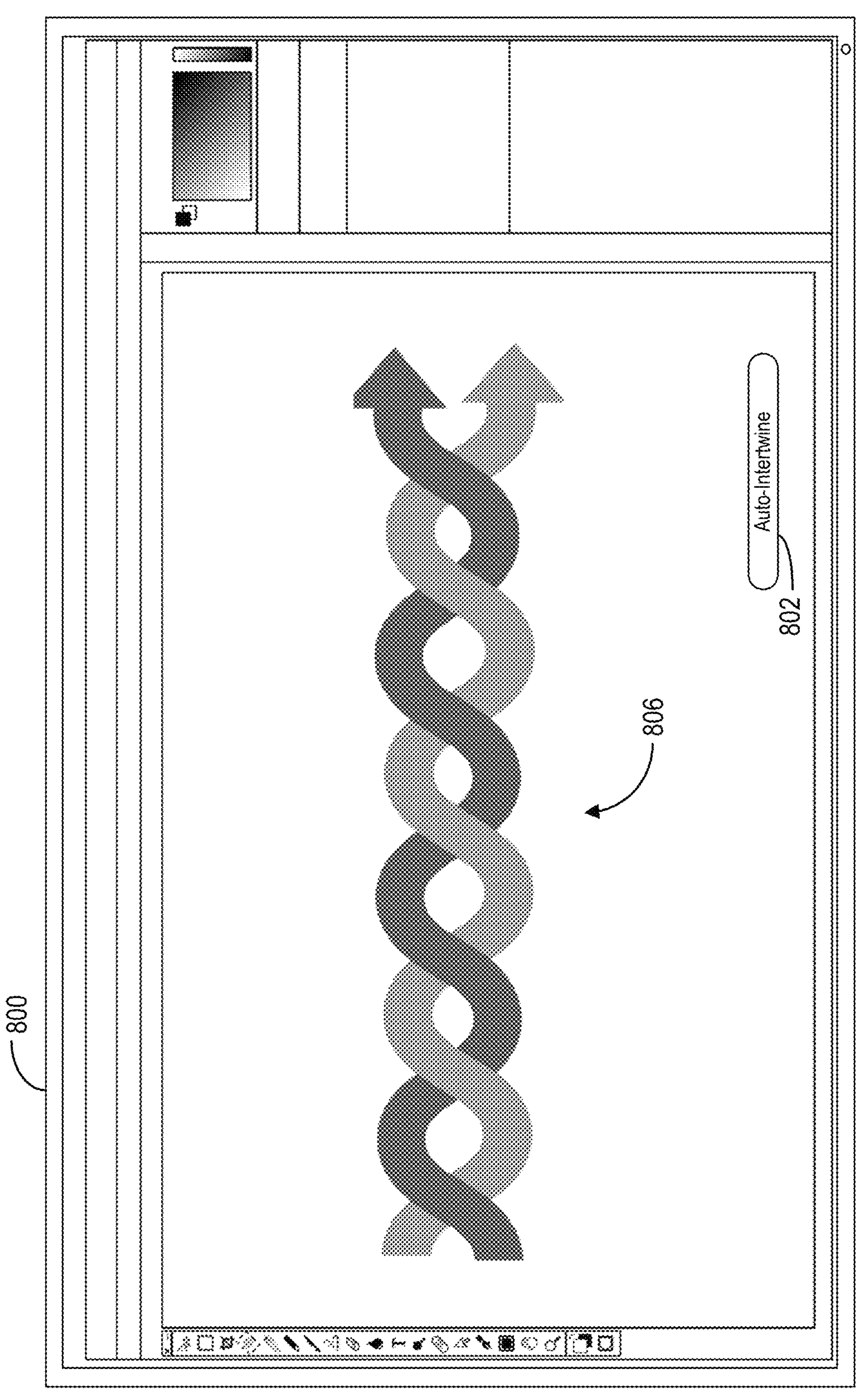

As discussed above, in one or more implementations, the structure aware intertwining system 102 generates an intertwined digital design having intertwined objects from any digital design. For example, FIGS. 8A and 8B illustrate a process flow of generating an intertwined digital design in a graphical user interface intertwined digital design in accordance with one or more embodiments. For example, the structure aware intertwining system 102 receives user input via an auto-intertwine element 802 of a graphical user interface 800 to generate the intertwined digital design 806 from the corresponding original digital design 804. digital design Using one or more of the various embodiments described above with respect to FIGS. 2-7, the structure aware intertwining system 102 generates the intertwined digital design 806 with minimal user input (e.g., a single user interaction). For example, in one or more embodiments, the structure aware intertwining system 102 displays the original digital design 804 in the graphical user interface 800. Further, in these or other embodiments, the structure aware intertwining system 102 receives user input via the auto-intertwine element 802. For instance, the user input can be a single user interaction with the auto-intertwine element 802. Moreover, in response to receiving the user input, the structure aware intertwining system 102 performs one or more of the embodiments described above with respect to FIGS. 2-7 to generate the intertwined digital design 806 illustrated in FIG. 8B. Indeed, as shown in FIG. 8B, the structure aware intertwining system 102 displays the two objects of the intertwined digital design 806 in the graphical user interface 800 with an intertwined appearance.

Accordingly, the structure aware intertwining system 102 uses the various embodiments described with respect to FIGS. 2-7 to generate intertwined digital designs having multiple objects with an intertwined appearance. Indeed, the structure aware intertwining system 102 makes rapid and accurate intertwining of objects in digital designs possible by using one or more of the above described embodiments. For example, the structure aware intertwining system 102 generates the intertwined digital design 806 such that the objects are intertwined at each of the 7 overlapping locations of the two objects with a single user interaction. Accordingly, the structure aware intertwining system 102 efficiently and flexibly generates intertwined digital designs with minimal user interactions.

Figure 9:
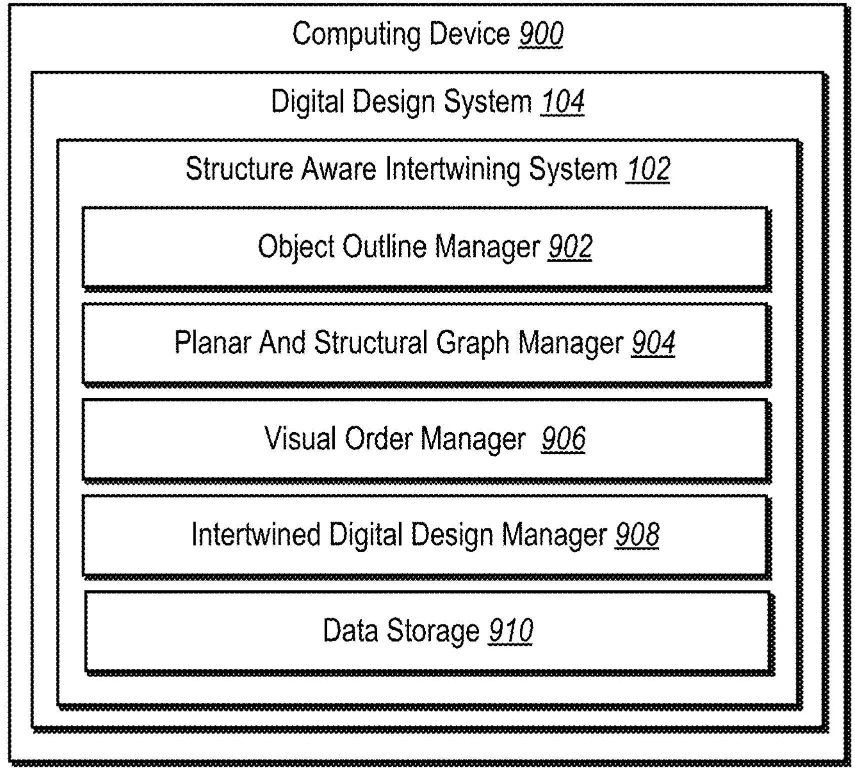
FIG. 9 illustrates an example schematic diagram of the structure aware intertwining system in accordance with one or more embodiments.

Turning to FIG. 9, additional detail will now be provided regarding various components and capabilities of the structure aware intertwining system 102. In particular, FIG. 9 illustrates an example schematic diagram of a computing device 900 (e.g., the server(s) 106 and/or the client device 110) implementing the structure aware intertwining system 102 in accordance with one or more embodiments of the present disclosure for components 900-910. As illustrated in FIG. 9, the structure aware intertwining system 102 includes an object outline manager 902, a planar and structural graph manager 904, a visual order manager 906, an intertwined digital design manager 908, and data storage 910.

In some embodiments, the object outline manager 902 accesses one or more digital design documents. For example, the object outline manager 902 accesses the digital design document(s) and generates outlines of objects within the digital design to determine boundaries of the objects. In particular, in some implementations, the object outline manager 902 generates outlines of objects with the boundaries of the objects such that the object outlines are available for further use by additional components of the structure aware intertwining system 102, such as the planar and structural graph manager 904.

In one or more embodiments, the planar and structural graph manager 904 generates, based on the boundaries of the objects within the digital design, a planar graph, and a structural graph. For example, the planar and structural graph manager 904 receives the object outlines and generates a planar graph 404 representing the overlapping surfaces of objects in the digital design as vertices and object paths between the overlapping surfaces as edges. Further, in one or more implementations, the planar and structural graph manager 904 performs operations on the planar graph 404. In particular, in some embodiments, the planar and structural graph manager 904 performs a vertex contraction 406 and/or a vertex removal to generate a structural graph 502 from the planar graph 404. Accordingly, in these or other embodiments, the planar and structural graph manager 904 generates the structural graph 502 that represents overlapping surfaces of objects in the digital design as nodes and object paths between the overlapping surfaces as edges.

In some implementations, the visual order manager 906 assigns a visual order to the nodes of the structural graph 502. For example, the visual order manager 906 receives the structural graph 502 from the planar and structural graph manager 904 and assigns a visual order to the nodes of the structural graph 502. Indeed, in these or other embodiments, the visual order manager 906 assigns the visual order to the nodes of the structural graph utilizing a heuristic that causes adjacent overlapping areas to have different objects on top and seeks to achieve intertwining symmetry. Moreover, in one or more embodiments, the visual order manager 906 identifies a first node and assigns a first visual order to the first node, then assigns a different a visual order to nodes adjacent to the first node.

In one or more implementations, the intertwined digital design manager 908 receives the structural graph with the visual order assignments to the nodes and generates an intertwined digital design (e.g., the intertwined image 608). For example, the intertwined digital design manager 908 generates the intertwined image 608 by ordering the overlapping surfaces of the objects in accordance with the assigned visual order of the nodes. Further, the intertwined digital design manager 908 generates alternative intertwined digital designs by reordering the overlapping surfaces of the objects in accordance with alternative assigned visual orders of the nodes of the structural graph 502.

The data storage 910 stores datasets, documents, and graphs (planar graphs and structural graphs). For example, the data storage 910 stores digital design documents and stores corresponding structures such as object outlines, planar and structural graphs, visual orders assigned to the structural graphs, and intertwined digital design of the digital design.

Each of the components 902-910 of the structure aware intertwining system 102 can include software, hardware, or both. For example, the components 902-910 can include one or more instructions stored on a computer-readable storage medium and executable by processors of one or more computing devices, such as a client device or server device. When executed by the one or more processors, the computer-executable instructions of the structure aware intertwining system 102 can cause the computing device(s) to perform the methods described herein. Alternatively, the components 902-910 can include hardware, such as a special-purpose processing device to perform a certain function or group of functions. Alternatively, the components 902-910 of the structure aware intertwining system 102 can include a combination of computer-executable instructions and hardware.

Furthermore, the components 902-910 of the structure aware intertwining system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-910 of the structure aware intertwining system 102 may be implemented as a stand-alone application, such as a desktop or mobile application. Furthermore, the components 902-910 of the structure aware intertwining system 102 may be implemented as one or more web-based applications hosted on a remote server. Alternatively, or additionally, the components 902-910 of the structure aware intertwining system 102 may be implemented in a suite of mobile device applications or "apps." For example, in one or more embodiments, the structure aware intertwining system 102 can comprise or operate in connection with digital software applications such as ADOBE PHOTOSHOP®, ADOBE LIGHTROOM®, ADOBE ACROBAT® MOBILE, ADOBE® PROTEUS, ADOBE® XD, ADOBE LIGHTROOM® MOBILE, ADOBE ACROBAT®, ADOBE ACROBAT® STANDARD, ADOBE DOCUMENT CLOUD®, ADOBE INDESIGN® CREATIVE CLOUD, ADOBE PHOTOSHOP® EXPRESS. The foregoing are either registered trademarks or trademarks of Adobe Inc. in the United States and/or other countries.

FIGS. 1-9, the corresponding text, and the examples provide a number of different systems, methods, and non-transitory computer readable media for generating a modified intertwined digital design by generating a structural graph and assigning nodes of the structural graph a visual order. In addition to the foregoing, embodiments can also be described in terms of flowcharts comprising acts for accomplishing a particular result. For example, FIGS. 10 and 11 illustrate flowcharts of an example sequences of acts in accordance with one or more embodiments.

While FIGS. 10 and 11 illustrate acts according to some embodiments, alternative embodiments may omit, add to, reorder, and/or modify any of the acts shown in FIGS. 10 and 11. The acts of FIGS. 10 and 11 can be performed as part of a method. Alternatively, a non-transitory computer readable medium can comprise instructions, that when executed by one or more processors, cause a computing device to perform the acts of FIGS. 10 and 11. In still further embodiments, a system can perform the acts of FIGS. 10 and 11. Additionally, the acts described herein may be repeated or performed in parallel with one another or in parallel with different instances of the same or other similar acts.

FIG. 10 illustrates an example series of acts 1000 for generating an intertwined digital design by generating a structural graph and assigning nodes of the structural graph a visual order based on a configuration of the structural graph. The series of acts 1000 can include an act 1002 of generating an intertwined digital design by ordering the overlapping surfaces of the objects in accordance with the assigned visual order of the nodes; an act 1004 of generating a structural graph of a digital design that represents overlapping surfaces of objects in the digital design as nodes and object paths between the overlapping surfaces as edges; and an act 1006 of assigning a visual order to the nodes based on a configuration of the structural graph.

For example, in one or more embodiments, the series of acts 1000 include generating, by at least one processor, a structural graph of a digital design that represents overlapping surfaces of objects in the digital design as nodes and object paths between the overlapping surfaces as edges, assigning, by the at least one processor, a visual order to the nodes based on a configuration of the structural graph, and generating, by the at least one processor, an intertwined digital design by ordering the overlapping surfaces of the objects in accordance with the assigned visual order of the nodes.

In one or more implementations, generating the structural graph of the digital design that represents overlapping surfaces of objects in the digital design includes generating a planar graph of the objects in the digital design. Moreover, in some embodiments, the series of acts 1000 can include generating an overlapping surface vertex group by determining a plurality of vertices corresponding to the overlapping surfaces of the objects in the digital design.

In addition, in some implementations, the series of acts 1000 include removing one or more vertices from the planar graph that are not in the overlapping surface vertex group. Furthermore, in some embodiments, the series of acts 1000 can include generating an aggregate vertex by determining adjacent vertices corresponding to the overlapping surfaces of the objects and aggregating the adjacent vertices to generate the aggregate vertex.

In some implementations, the series of acts 1000 can include generating an alternative assigned visual order of the nodes and generating an alternative intertwined digital design by reordering the overlapping surfaces of the objects in accordance with the alternative assigned visual order of the nodes. Moreover, in some embodiments, the series of acts 1000 can include generating an assisted intertwined digital design by receiving, via a graphical user interface of a client device, a user assigned visual order of a specified overlapping surface of the objects and reordering remaining overlapping surfaces of the objects in accordance with the user assigned visual order of the specified overlapping surface of the objects.

In addition, in some implementations, assigning the visual order to the nodes based on the configuration of the structural graph includes assigning a first visual order to a first node and not assigning any visual order to a second node adjacent to the first node. Furthermore, in some embodiments, not assigning any visual order to the second node adjacent to the first node includes determining that a surface area of the digital design between the first node and the second node fails to meet a threshold surface area size.

In one or more implementations, assigning the visual order to nodes based on the configuration of the structural graph includes assigning a first visual order to a first node, assigning a second visual order to a second node adjacent to the first node, and assigning a third visual order to a third node adjacent to the first node and the second node.

Moreover, in some embodiments, assigning the visual order to the nodes based on the configuration of the structural graph includes utilizing a heuristic that causes adjacent overlapping areas to have different objects on top and seeks to achieve intertwining symmetry. In addition, in some implementations, assigning the visual order to the nodes includes assigning different visual orders to adjacent nodes.

FIG. 11 illustrates an example series of acts 1100 for generating a modified intertwined digital design by generating outlines of objects within a digital design to determine boundaries of the objects, generating, based on the boundaries of the objects, a structural graph of the digital design, and assigning a visual order to the nodes of the structural graph. The series of acts 1100 can include an act 1102 of generating an intertwined digital design by ordering the overlapping surfaces of the objects in accordance with the assigned visual order of the nodes; an act 1104 of generating outlines of objects within a digital design to determine boundaries of the objects; an act 1106 of generating, based on the boundaries of the objects, a structural graph of the digital design that represents overlapping surfaces of the objects in the digital design as nodes and object paths between the overlapping surfaces as edges; and an act 1108 of assigning a visual order to the nodes of the structural graph utilizing a heuristic that causes adjacent overlapping areas to have different objects on top and seeks to achieve intertwining symmetry.

In addition, in some implementations, the series of acts 1100 can include generating outlines of objects within a digital design to determine boundaries of the objects, generating, based on the boundaries of the objects, a structural graph of the digital design that represents overlapping surfaces of the objects in the digital design as nodes and object paths between the overlapping surfaces as edges, assigning a visual order to the nodes of the structural graph utilizing a heuristic that causes adjacent overlapping areas to have different objects on top and seeks to achieve intertwining symmetry, and generating an intertwined digital design by ordering the overlapping surfaces of the objects in accordance with the assigned visual order of the nodes.

Furthermore, in some embodiments, assigning the visual order to the nodes includes assigning a first visual order to a first node and assigning a second visual order to a second node adjacent to the first node. In one or more implementations, the series of acts 1100 can include determining the first node by identifying, from among the nodes, a node having at least one of a highest number of adjacent nodes or a highest number of possible visual orders.

Moreover, in some embodiments, the series of acts 1100 can include determining the second node adjacent to the first node by identifying, from among the nodes, that the second node shares an edge with the first node in the structural graph. In addition, in some implementations, the series of acts 1100 can include assigning a first visual order priority to a first object among the objects within the digital design and assigning a second visual order priority to a second object among the objects within the digital design.

Furthermore, in some embodiments, assigning the first visual order to the first node includes assigning the first visual order priority to the first node. In some implementations, assigning the visual order to the nodes includes assigning the visual order to a set percentage of nodes.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
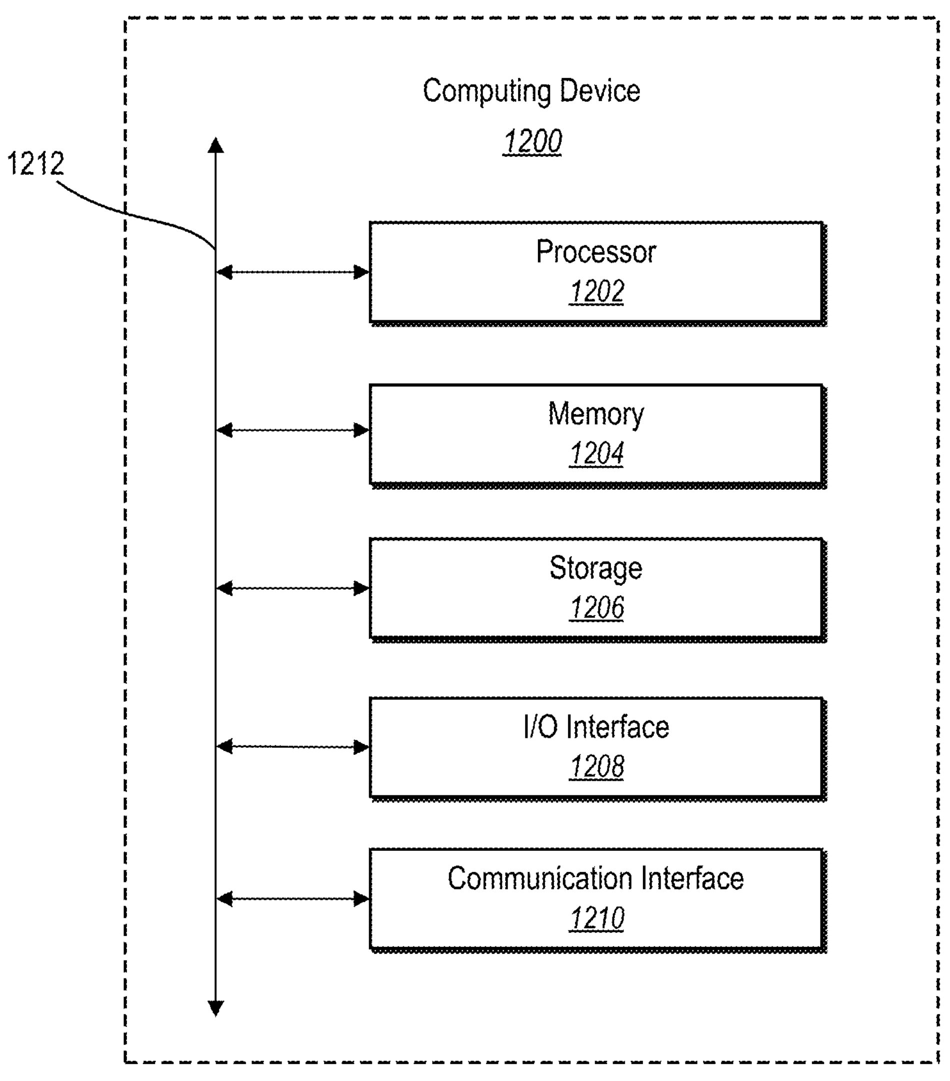
FIG. 12 illustrates a block diagram of an example computing device for implementing one or more embodiments of the present disclosure.

FIG. 12 illustrates a block diagram of exemplary computing device 1200 (e.g., the server(s) 106 and/or the client device 110) that may be configured to perform one or more of the processes described above. One will appreciate that server(s) 106 and/or the client device 110 may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other implementations. Furthermore, in certain implementations, computing device 1200 can include fewer components than those shown in FIG. 12. Components of computing device 1200 shown in FIG. 12 will now be described in additional detail.

In particular implementations, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage device 1206 and decode and execute them. In particular implementations, processor 1202 may include one or more internal caches for data, instructions, or addresses. As an example, and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example, and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular implementations, storage device 1206 is non-volatile, solid-state memory. In other implementations, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, by at least one processor, a structural graph of a digital design that represents overlapping surfaces of objects in the digital design as nodes and object paths between the overlapping surfaces as edges;

assigning, by the at least one processor, a visual order to the nodes indicating which object of the objects will be visible at each of the nodes in an intertwined digital design based on a configuration of the structural graph by utilizing a heuristic that assigns adjacent nodes of the structural graph to have different objects visible to achieve intertwining symmetry between the objects by balancing a number of times each of the objects is assigned as visible across the nodes of the structural graph; and generating, by the at least one processor, the intertwined digital design by ordering the overlapping surfaces of the objects in accordance with the assigned visual order of the nodes.

2. The computer-implemented method of claim 1, wherein generating the structural graph of the digital design that represents the overlapping surfaces of objects in the digital design comprises generating a planar graph of the objects in the digital design.

3. The computer-implemented method of claim 2, further comprising generating an overlapping surface vertex group by determining a plurality of vertices corresponding to the overlapping surfaces of the objects in the digital design.

4. The computer-implemented method of claim 3, further comprising removing one or more vertices from the planar graph that are not in the overlapping surface vertex group.

5. The computer-implemented method of claim 2, further comprising generating an aggregate vertex by:

determining adjacent vertices corresponding to the overlapping surfaces of the objects; and aggregating the adjacent vertices to generate the aggregate vertex.

6. The computer-implemented method of claim 1, further comprising:

generating an alternative assigned visual order of the nodes; and generating an alternative intertwined digital design by reordering the overlapping surfaces of the objects in accordance with the alternative assigned visual order of the nodes.

7. The computer-implemented method of claim 1, further comprising generating an assisted intertwined digital design by:

receiving, via a graphical user interface of a client device, a user assigned visual order of a specified overlapping surface of the objects; and reordering remaining overlapping surfaces of the objects in accordance with the user assigned visual order of the specified overlapping surface of the objects.

8. A system comprising:

one or more memory devices; and one or more processors coupled to the one or more memory devices, the one or more processors configured to cause the system to:

generate outlines of objects within a digital design to determine boundaries of the objects;

generate, based on the boundaries of the objects, a structural graph of the digital design that represents overlapping surfaces of the objects in the digital design as nodes and object paths between the overlapping surfaces as edges;

assign a visual order to the nodes of the structural graph indicating which object of the objects will be visible at each of the nodes in an intertwined digital design utilizing a heuristic that causes adjacent overlapping areas to have different objects on top by assigning the different objects to be visible at adjacent nodes of the structural graph to achieve intertwining symmetry between the objects by balancing a number of times each of the objects is assigned as visible across the nodes of the structural graph; and generate the intertwined digital design by ordering the overlapping surfaces of the objects in accordance with the assigned visual order of the nodes.

9. The system of claim 8, wherein assigning the visual order to the nodes comprises:

assigning a first visual order to a first node; and assigning a second visual order to a second node adjacent to the first node.

10. The system of claim 9, wherein the one or more processors are further configured to:

determine the first node by identifying, from among the nodes, a node having at least one of a highest number of adjacent nodes or a highest number of possible visual orders.

11. The system of claim 10, wherein the one or more processors are further configured to:

determine the second node adjacent to the first node by identifying, from among the nodes, that the second node shares an edge with the first node in the structural graph.

12. The system of claim 9, wherein the one or more processors are further configured to:

assign a first visual order priority to a first object among the objects within the digital design; and assign a second visual order priority to a second object among the objects within the digital design.

13. The system of claim 12, wherein assigning the first visual order to the first node comprises assigning the first visual order priority to the first node.

14. The system of claim 8, wherein assigning the visual order to the nodes comprises assigning the visual order to a set percentage of nodes.

15. A non-transitory computer readable medium storing executable instructions which, when executed by a processing device, cause the processing device to perform operations comprising:

generating a structural graph of a digital design that represents overlapping surfaces of objects in the digital design as nodes and object paths between the overlapping surfaces as edges;

assigning a visual order to the nodes indicating which object of the objects will be visible at each of the nodes in an intertwined digital design based on a configuration of the structural graph by utilizing a heuristic that assigns adjacent nodes of the structural graph to have different objects visible to achieve intertwining symmetry between the objects by balancing a number of times each of the objects is assigned as visible across the nodes of the structural graph; and generating the intertwined digital design by ordering the overlapping surfaces of the objects in accordance with the assigned visual order of the nodes.

16. The non-transitory computer readable medium of claim 15, wherein assigning the visual order to the nodes based on the configuration of the structural graph comprises assigning a first visual order to a first node and not assigning any visual order to a second node adjacent to the first node.

17. The non-transitory computer readable medium of claim 16, wherein not assigning any visual order to the second node adjacent to the first node comprises determining that a surface area of the digital design between the first node and the second node fails to meet a threshold surface area size.

18. The non-transitory computer readable medium of claim 15, wherein assigning the visual order to the nodes based on the configuration of the structural graph comprises:

assigning a first visual order to a first node;

assigning a second visual order to a second node adjacent to the first node; and assigning a third visual order to a third node adjacent to the first node and the second node.

19. The non-transitory computer readable medium of claim 15, wherein utilizing the heuristic comprises:

identifying a first node from among the nodes of the structural graph having at least one of a highest number of adjacent nodes or a highest number of possible visual orders; and assigning the visual order starting from the first node to cause adjacent overlapping areas to have the different objects on top to achieve the intertwining symmetry.

20. The non-transitory computer readable medium of claim 15, wherein assigning the visual order to the nodes comprises assigning different visual orders to the adjacent nodes.

* * * * *